United States Patent
Viehauser

(10) Patent No.: US 12,340,459 B2
(45) Date of Patent: Jun. 24, 2025

(54) SYSTEMS AND METHODS OF IMAGE REPROJECTION

(71) Applicant: QUALCOMM Incorporated, San Diego, CA (US)

(72) Inventor: Robert Peter Viehauser, Bad Hofgastein (AT)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 17/934,114

(22) Filed: Sep. 21, 2022

(65) Prior Publication Data
US 2024/0095997 A1    Mar. 21, 2024

(51) Int. Cl.
| | |
|---|---|
| G06T 15/10 | (2011.01) |
| G06T 7/20 | (2017.01) |
| G06T 7/73 | (2017.01) |
| G06T 15/50 | (2011.01) |
| G06V 10/70 | (2022.01) |
| G06V 30/19 | (2022.01) |

(52) U.S. Cl.
CPC ............ *G06T 15/10* (2013.01); *G06T 7/20* (2013.01); *G06T 7/73* (2017.01); *G06T 15/506* (2013.01); *G06V 10/70* (2022.01); *G06T 2200/08* (2013.01); *G06T 2200/24* (2013.01); *G06T 2207/20076* (2013.01); *G06T 2207/20081* (2013.01); *G06T 2207/20084* (2013.01); *G06V 30/191* (2022.01)

(58) Field of Classification Search
None
See application file for complete search history.

(56) References Cited

U.S. PATENT DOCUMENTS

| | | | |
|---|---|---|---|
| 2013/0242054 A1* | 9/2013 | Chiu | ................ G06T 3/18 348/46 |
| 2016/0042515 A1* | 2/2016 | Sorgi | ................ G06T 7/80 382/154 |

(Continued)

OTHER PUBLICATIONS

Cai L., et al., "Multi-object Detection and Tracking by Stereo Vision", Pattern Recognition, Elsevier, GB, vol. 43, No. 12, Dec. 1, 2010, pp. 4028-4041, XP027260728, Abstract, Section 1.4, 2, 3, Figure 7.

(Continued)

*Primary Examiner* — James A Thompson
(74) *Attorney, Agent, or Firm* — QUALCOMM Incorporated

(57) ABSTRACT

Imaging systems and techniques are described. An imaging system receives image data of an environment according to a first perspective. The imaging system detects an object in the image data. The imaging system generates, based on the image data, reprojected image data of at least a portion of the environment (e.g., representing at least the object) according to a second perspective that is distinct from the first perspective. In some examples, the imaging system generates and outputs an indicator of a status of the object based on the reprojected image data. In some examples, the indicator of the status of the object can indicate a change in the status of the object, such as a change in an illumination characteristic of a light source, a change in content displayed on a display screen, a change in the object's movement, and the like.

30 Claims, 10 Drawing Sheets

(56) References Cited

U.S. PATENT DOCUMENTS

| | | | | |
|---|---|---|---|---|
| 2020/0090344 A1* | 3/2020 | Baig | ............... | G02B 27/017 |
| 2022/0183208 A1* | 6/2022 | Sibley | ............... | G05D 1/249 |
| 2022/0366636 A1* | 11/2022 | Lasram | ............... | G07C 5/0808 |
| 2022/0392151 A1* | 12/2022 | Blodow | ............... | G06T 15/20 |
| 2023/0009367 A1* | 1/2023 | Goodman | ............... | G06T 7/73 |
| 2023/0032888 A1* | 2/2023 | Li | ............... | G06F 18/22 |
| 2023/0135787 A1* | 5/2023 | Peleg | ............... | G06F 3/04842 |
| 2023/0150429 A1* | 5/2023 | Slutsky | ............... | G06V 10/82 |
| | | | | 345/419 |

OTHER PUBLICATIONS

Partial International Search Report—PCT/US2023/073887—ISA/EPO—Jan. 25, 2024.

Rematas K., et al., "Novel Views of Objects from a Single Image", arXiv:1602.00328v2 [cs.CV], Aug. 15, 2016, pp. 1-14, XP093119117, Abstract, Sections 1, 3, 3.1, 4.1, 4.2, 4.2.1, 4.2.3, 5, 7, 8, Figures 2, 19.

International Search Report and Written Opinion—PCT/US2023/073887—ISA/EPO—Mar. 18, 2024.

\* cited by examiner

SYSTEMS AND METHODS OF IMAGE REPROJECTION

FIELD

This application is related to image processing. More specifically, this application relates to systems and methods of image reprojection to represent a detected object from a different perspective and of determining a status of the detected object based on the image reprojection.

BACKGROUND

Many devices include one or more cameras. For example, a smartphone or tablet includes a front facing camera to capture selfie images and a rear facing camera to capture an image of a scene (such as a landscape or other scenes of interest to a device user). A camera can capture images using an image sensor of the camera. The representation of a scene in an image captured by a camera depends on the field of view and/or viewport of the camera (e.g., the portion of the scene that the camera is able to observe using the image sensor), for instance based on the position and orientation of the camera in relation to the scene. In some examples, a specific part of a scene may be difficult to see clearly if the viewport of the camera does not provide a clear view of the specific part of the scene, for instance because the field of view is oriented at a sharp angle relative to the specific part of the scene. Various system can make use of image data from cameras, such as virtual reality (VR) or augmented reality (AR) systems.

BRIEF SUMMARY

In some examples, systems and techniques are described for image processing. Imaging systems and techniques are described. An imaging system receives image data of an environment according to a first perspective. The imaging system detects an object in the image data. The imaging system generates, based on the image data, reprojected image data of at least a portion of the environment (e.g., representing at least the object) according to a second perspective that is distinct from the first perspective. The imaging system generates and outputs an indicator of a status of the object based on the reprojected image data. In some examples, the indicator of the status of the object can indicate a change in the status of the object and/or region of interest (RoI), such as a change in an illumination characteristic of a light source, a change in content displayed on a display screen, a change in the object's movement, and the like.

In one example, an apparatus for media processing is provided. The apparatus includes a memory and one or more processors (e.g., implemented in circuitry) coupled to the memory. The one or more processors are configured to and can: receive image data of an environment, the image data representing the environment from a first perspective; detect, in the image data, an object in the environment; and generate, based on the image data, reprojected image data of at least a portion of the environment, the reprojected image data representing at least the object from a second perspective that is distinct from the first perspective.

In another example, a method of image processing is provided. The method includes: receiving image data of an environment, the image data representing the environment from a first perspective; detecting, in the image data, an object in the environment; and generating, based on the image data, reprojected image data of at least a portion of the environment, the reprojected image data representing at least the object from a second perspective that is distinct from the first perspective.

In another example, a non-transitory computer-readable medium is provided that has stored thereon instructions that, when executed by one or more processors, cause the one or more processors to: receive image data of an environment, the image data representing the environment from a first perspective; detect, in the image data, an object in the environment; and generate, based on the image data, reprojected image data of at least a portion of the environment, the reprojected image data representing at least the object from a second perspective that is distinct from the first perspective.

In another example, an apparatus for image processing is provided. The apparatus includes: means for receiving image data of an environment, the image data representing the environment from a first perspective; detecting, in the image data, an object in the environment; and generating, based on the image data, reprojected image data of at least a portion of the environment, the reprojected image data representing at least the object from a second perspective that is distinct from the first perspective.

In some aspects, one or more of the methods, apparatuses, and computer-readable medium described above further comprise: receiving an input using a user interface, wherein the input is indicative of the second perspective. In some aspects, one or more of the methods, apparatuses, and computer-readable medium described above further comprise: generating pose information corresponding to the second perspective based on positions of features of the object in the environment.

In some aspects, generating the reprojected image data of at least the portion of the environment includes using probabilistic reprojection to generate the reprojected image data. In some aspects, generating the reprojected image data of at least the portion of the environment according to the second perspective includes using an output of a trained machine learning model in response to input of the image data into the trained machine learning model.

In some aspects, one or more of the methods, apparatuses, and computer-readable medium described above further comprise: receiving prior image data of the environment; and determining that the image data is missing visual information for a portion of the object, wherein the portion of the object is to be discernable from the second perspective, wherein generating the reprojected image data of at least the portion of the environment includes reconstructing the visual information for the portion of the object based on the prior image data. In some aspects, one or more of the methods, apparatuses, and computer-readable medium described above further comprise: generating a mask associated with an occlusion over the portion of the object, wherein the image data is missing the visual information for the portion of the object due to the occlusion occluding the portion of the object in the image data.

In some aspects, one or more of the methods, apparatuses, and computer-readable medium described above further comprise: determining that the image data is missing visual information for a portion of the object, wherein the portion of the object is to be discernable from the second perspective, wherein generating the reprojected image data of at least the portion of the environment includes reconstructing the visual information for the portion of the object using an output of a trained machine learning model in response to input of the image data into the trained machine learning model.

In some aspects, one or more of the methods, apparatuses, and computer-readable medium described above further comprise: determining an illumination scheme illuminating the environment, wherein generating the reprojected image data of at least the portion of the environment includes reconstructing the illumination scheme according to the second perspective. In some aspects, one or more of the methods, apparatuses, and computer-readable medium described above further comprise: modifying the image data to normalize illumination in the image data before generating the reprojected image data of at least the portion of the environment based on the image data.

In some aspects, one or more of the methods, apparatuses, and computer-readable medium described above further comprise: outputting an indicator of a status of the object based on the reprojected image data. In some aspects, one or more of the methods, apparatuses, and computer-readable medium described above further comprise: monitoring a status of the object over a time period based on the reprojected image data, wherein the image data and the reprojected image data both include images corresponding to different times during the time period; and identifying a change in the status of the object during the time period, wherein the indicator of the status of the object is indicative of the change in the status of the object. In some aspects, the change in the status of the object includes a change in an illumination characteristic of a light source, wherein the object includes the light source. In some aspects, one or more of the methods, apparatuses, and computer-readable medium described above further comprise: parsing one or more characters on the object in the reprojected image data using optical character recognition (OCR), wherein the change in the status of the object is associated with the one or more characters. In some aspects, the change in the status of the object includes a change in a motion of at least a portion of the object.

In some aspects, the image data is received from an image sensor. In some aspects, a first subset of the image data is received from a first image sensor, wherein a second subset of the image data is received from a second image sensor. In some aspects, detecting the object in the image data includes tracking the object from the first subset of the image data to the second subset of the image data.

In some aspects, one or more of the methods, apparatuses, and computer-readable medium described above further comprise: causing a display to display information based on the reprojected image data. In some aspects, one or more of the methods, apparatuses, and computer-readable medium described above further comprise: causing a communication interface to transmit information based on the reprojected image data to a recipient device.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures.

DETAILED DESCRIPTION

Figure 1:
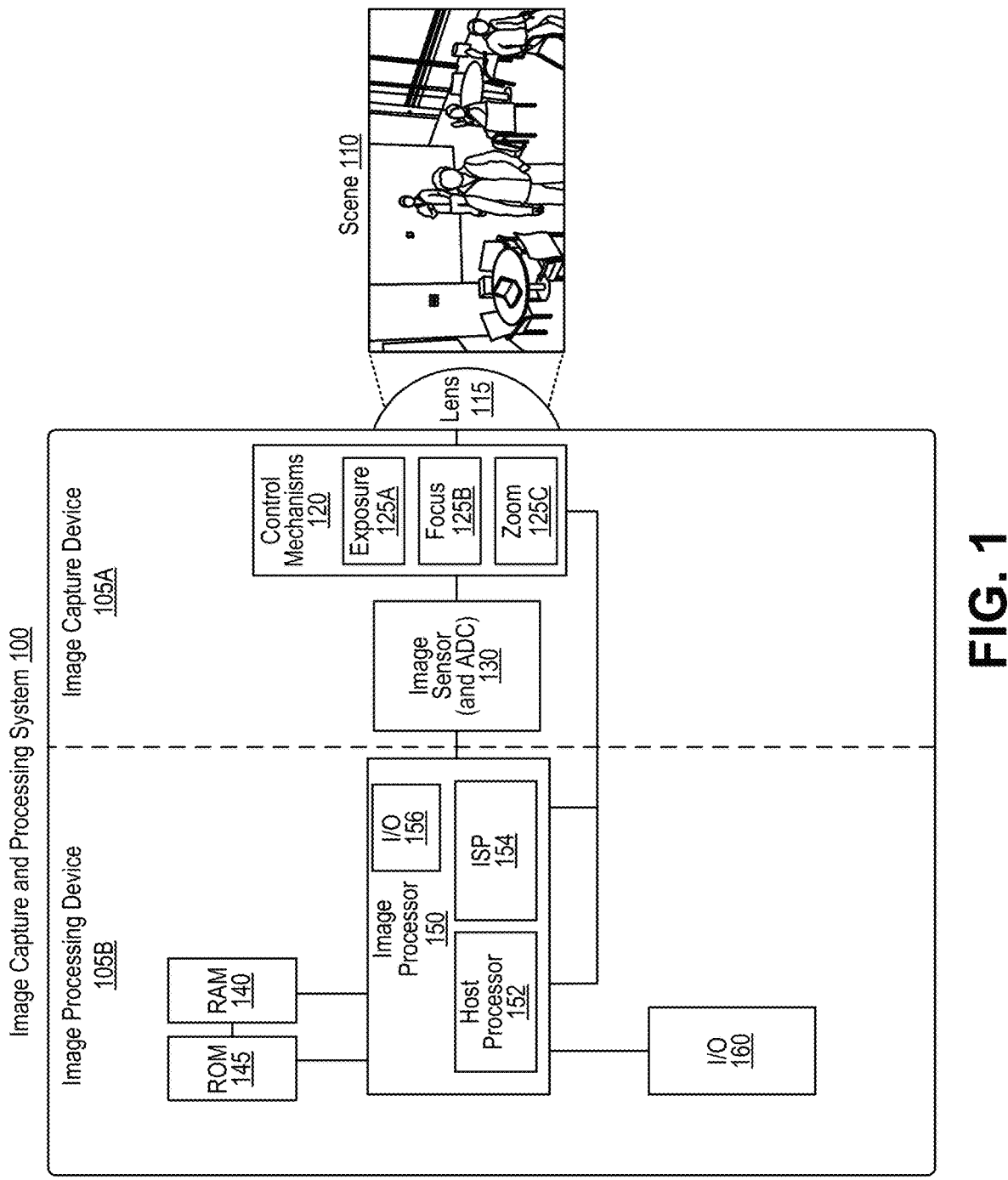
FIG. 1 is a block diagram illustrating an example architecture of an image capture and processing system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Extended reality (XR) systems or devices can provide virtual content to a user and/or can combine real-world views of physical environments (scenes) and virtual environments (including virtual content). XR systems facilitate user interactions with such combined XR environments. The real-world view can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

A representation of a scene in an image captured by a camera depends on the pose, viewport, and/or field of view of the camera, for instance based on the position and orientation of the camera in relation to the scene. In some examples, a specific part of a scene may be difficult to see clearly if the pose, viewport, and/or field of view of the camera does not provide a clear view of the specific part of the scene, for instance because the pose, viewport, and/or field of view is oriented at a sharp angle relative to the specific part of the scene.

In some examples, systems and techniques are described for image processing. An imaging system receives image data of an environment according to a first perspective. The imaging system detects an object in the image data. The imaging system generates, based on the image data, reprojected image data of at least a portion of the environment (e.g., representing at least the object) according to a second perspective that is distinct from the first perspective. The imaging system generates and outputs an indicator of a status of the object based on the reprojected image data. In some examples, the indicator of the status of the object can indicate a change in the status of the object, such as a change in an illumination characteristic of a light source, a change in content displayed on a display screen, a change in the object's movement, and the like.

The imaging systems and techniques described herein provide a number of technical improvements over prior imaging systems. For instance, the imaging systems and techniques described herein provide improved reliability, accuracy, and precision in identifying a status of an object, and/or changes to the status of the object, based on the image reprojection. The imaging systems and techniques described herein can provide improved flexibility for determining a status of an object, and/or changes to the status of the object, because a camera does not need to be pointed directly at a surface of the object in order to determine a status associated with that surface of the object. The imaging systems and techniques described herein can provide improved efficiency for determining a statuses of multiple objects, and/or changes to the statuses of the objects, because a single camera whose field of view includes multiple objects can be used, with reprojection, to accurately track statuses of each of the objects over time, without any need for cameras specific to each object.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 105 of the system 100 faces a scene 110 and receives light from the scene 110. The lens 105 bends the light toward the image sensor 130. The light received by the lens 105 passes through an aperture controlled by one or more control mechanisms 120 and is received by an image sensor 130. In some examples, the scene 110 is a scene in an environment. In some examples, the scene 110 is a scene of at least a portion of a user. For instance, the scene 110 can be a scene of one or both of the user's eyes, and/or at least a portion of the user's face.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 105 relative to the position of the image sensor 130. For example, based on the focus setting, the focus control mechanism 125B can move the lens 105 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 105 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 105 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 105 in some cases) that receives the light from the scene 110 first, with the light then passing through an afocal zoom system between the focusing lens (e.g., lens 105) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1010 discussed with respect to the computing system 1000. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1020, read-only memory (ROM) 145 and/or 1025, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 105, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 1002.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
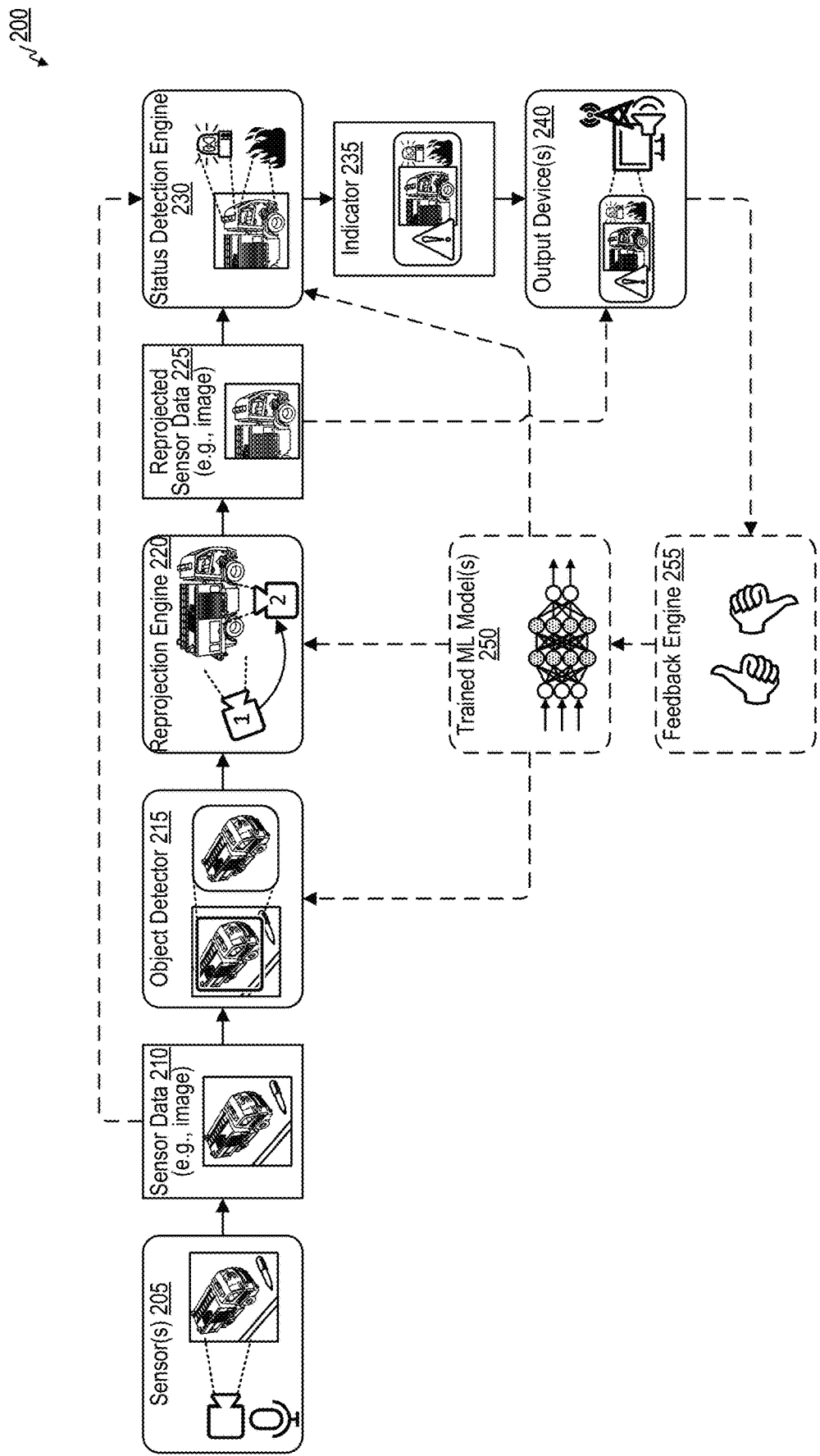
FIG. 2 is a block diagram illustrating an example architecture an imaging system that performs an imaging process, in accordance with some examples.

FIG. 2 is a block diagram illustrating an example architecture an imaging system 200 that performs an imaging process. The imaging system 200 can include at least one of the image capture and processing system 100, the image capture device 105A, the image processing device 105B, the HMD 310, the mobile handset 410, an imaging system that performs the imaging process 500 of FIG. 5, the user device 530, the camera 540, an imaging system that performs the imaging process 700 of FIG. 7, the user device 730, the camera 740, the neural network 800, an imaging system that performs the imaging process 900 of FIG. 9, the computing system 1000, or a combination thereof. In some examples, the imaging system 200 can include, for instance, one or more laptops, phones, tablet computers, mobile handsets, video game consoles, vehicle computers, desktop computers, wearable devices, televisions, media centers, extended reality (XR) systems, virtual reality (VR) systems, augmented reality (AR) systems, mixed reality (MR) systems, head-mounted display (HMD) devices, other types of computing devices discussed herein, or combinations thereof. In some examples, the imaging system 200, and the corresponding imaging process(es), can be used in network-based interactive system applications, such as those for video conferencing, extended reality (XR), video gaming, metaverse environments, or combinations thereof.

The imaging system 200 includes one or more sensors 205. In some examples, the sensor(s) 205 include one or more image sensors or one or more cameras. The image sensor(s) capture image data that can include one or more images, one or more videos, portions thereof, or combinations thereof. In some examples, at least one of the sensor(s) 205 can be directed toward the user (e.g., can face toward the user), and can thus capture sensor data (e.g., image data) of (e.g., depicting or otherwise representing) at least portion(s) of the user. In some examples, at least one of the sensor(s)

205 can be directed away from the user (e.g., can face away from the user) and/or toward an environment that the user is in, and can thus capture sensor data (e.g., image data) of (e.g., depicting or otherwise representing) at least portion(s) of the environment. In some examples, sensor data captured by at least one of the sensor(s) 205 that is directed away from the user and/or toward the can have a field of view (FoV) that includes, is included by, overlaps with, and/or otherwise corresponds to, a FoV of the eyes of the user. Within FIG. 2, a graphic representing the sensor(s) 205 illustrates the sensor(s) 205 as including a camera facing an environment with a toy firetruck and a pen on a table. Examples of the image sensor and/or the camera of the sensor(s) 205 can include the image capture and processing system 100, the image capture device 105A, the image processing device 105B, the image sensor 130, image sensor(s) of any of cameras 330A-330D, image sensor(s) of any of cameras 430A-430D, the camera 540, the camera 740, the image sensor of the imaging process 900, an image sensor of an input device 1045, or a combination thereof. Within FIG. 2, a graphic representing sensor data 210 illustrates an image of the environment with the toy firetruck and the pen depicted in the graphic representing the sensor(s) 205.

The sensor(s) 205 of the imaging system 200 can include one or more sensors that track information about the user and/or the environment. For instance, the sensor(s) 205 can track a pose (e.g., position and/or orientation) of the user and/or of the imaging system 200 within an environment. In some examples, the sensor(s) 205 can include an image sensor and/or a camera.

In some examples, the sensor(s) 205 of the imaging system 200 can include one or more other sensors in addition to the image sensor and/or camera, such as one or more other image sensors, other cameras, microphones, heart rate monitors, oximeters, biometric sensors, positioning receivers, Global Navigation Satellite System (GNSS) receivers, Inertial Measurement Units (IMUs), accelerometers, gyroscopes, gyrometers, barometers, thermometers, altimeters, depth sensors, light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, other sensors discussed herein, or combinations thereof. In some examples, the sensor(s) 205 include at least one input device 1045 of the computing system 1000. In some examples, sensor(s) 205 of the imaging system 200 can include one or more sensors that track information about the user and/or the environment. For instance, the sensor(s) 205 can track a pose (e.g., position and/or orientation) of the user and/or of the imaging system 200 within an environment. In some implementations, one or more of these additional sensor(s) may complement or refine sensor readings from the sensor(s) 205. For example, Inertial Measurement Units (IMUs), accelerometers, gyroscopes, or other sensors may be used to identify a pose (e.g., position and/or orientation) and/or motion(s) and/or acceleration(s) of the imaging system 200 and/or of the user in the environment, which can be used by the imaging system 200 to reduce motion blur, rotation blur, or combinations thereof.

The imaging system 200 includes an object detector 215. The object detector 215 is configured to, and can, detect, recognize, and/or track an object within the sensor data 210. For instance, the object detector 215 can detect, recognize, and/or track the toy firetruck object in the sensor data 210. The object detector 215 can include a feature extractor, a feature detector, a feature recognizer, a feature tracker, an object detector, an object recognizer, an object tracker, a face detector, a face recognizer, a face tracker, a person detector, a person recognizer, a person tracker, a classifier, or a combination thereof. The object detector 215 can perform feature extraction, feature detection, feature recognition, feature tracking, object detection, object recognition, object tracking, face detection, face recognition, face tracking, person detection, person recognition, person tracking, classification, or a combination thereof. Within FIG. 2, a graphic representing the object detector 215 illustrates a bounding box around an object (the toy firetruck) as depicted in the sensor data 210.

In some examples, the object detector 215 detects the object in the sensor data 210 by inputting the sensor data 210 into one or more of the one or more trained machine learning (ML) models 250 discussed herein, and receiving an output from the trained ML model(s) 250 indicating the face's position and/or orientation. The trained ML model(s) 250 can be trained (e.g., by imaging system 200) for use by the object detector 215 using training data that includes training sensor data (e.g., image data) that includes representations (e.g., depictions) of objects. In some examples, the training data can include already determined positions and/or orientations of the objects within the training sensor data. In some examples, the object detector 215 detects a position of the object within the sensor data 210 (e.g., pixel coordinates), a position of the object within the environment (e.g., 3D coordinates within the 3D volume of the environment), an orientation (e.g., pitch, yaw, and/or roll) of the object within the sensor data 210 (e.g., along axes about which rotation is discernable in the sensor data 210), and/or an orientation (e.g., pitch, yaw, and/or roll) of the object within the environment. In some examples, the pose of the object can include the pose of a first portion of the object relative to a second portion of the object. For instance, if the object is a person, the pose of the object can indicate whether the user's hands are up or down. If the object is a vehicle, the pose of the object can indicate whether the vehicle's door is open or closed. In some examples, the object detector 215 detects, recognizes, tracks, and/or predicts a pose of the object relative to the sensor(s) 205 within the environment (e.g., relative to the sensor(s) 205). For example, the pose (e.g., position and/or orientation) of the object in the environment (e.g., relative to the sensor(s) 205) can be based on established correspondences of extracted/trained features of the object to the sensor data. For instance, the pose of the object can be based on how a distance between two features on the object (e.g., an inter-eye distance) in the sensor data 210 compares to a reference distance (e.g., inter-eye distance) for a specific instance of the object, and/or for an average instance of the object. The features may be known based on a 3D model of the object that may have been generated (e.g., by the imaging system 200 or another system) prior to object detection. Examples of the object detected using the object detector 215 can include a person, a face, a vehicle, a computer, a device, a document, a toy, an animal, a plant, a structure, a target, a pattern, a texture (e.g., as in an image applied to a 3D mesh), a texture (e.g., as in a roughness, smoothness, pattern, and/or consistency of a surface), an optical glyph (e.g., a barcode, quick response (QR) code, an Aztec code, a data matrix, a MaxiCode, a Codablock F code, a PDF 17 code, and/or 2D barcode), a region of interest (RoI) on an object, a RoI in the environment, a RoI in the sensor data 210, a portion of an object, a portion of the environment, a portion of the sensor data 210, or a combination thereof. Changes to the pose of the object that are tracked by the object detector 215 can include changes in position, changes in orientation, changes in poses of portions of the object relative to other portions of the object, or a combination thereof. For instance, changes to the pose of the object can include the object moving translationally through the environment, the object rotating about one or more axes in the environment, a first portion of the object moving relative to a second portion of the object (e.g., a person waving their arms or turning their head, a vehicle opening its doors or rotating its wheels, etc.), or a combination thereof. In some examples, instead of or in addition to detecting/recognizing/tracking an object, the object detector 215 can detect, recognize, and/or track a RoI on the object, a RoI in the environment, a RoI in the sensor data 210, or a combination thereof.

In some examples, the object detector 215 can generate a three-dimensional (3D) model of at least a portion of the object based on the sensor data 210. The 3D model may include a 3D mesh, a texture for the mesh, or a combination thereof. In some examples, the sensor data 210 can include depth data (e.g., point cloud(s)) from at least one depth sensor (e.g., LIDAR, RADAR, SONAR, SODAR, ToF, structured light) of the sensor(s) 205, and can generate the 3D model based on the depth data from the at least one depth sensor. In some examples, the sensor data 210 can include image data from multiple image sensors of the sensor(s) 205, and the object detector 215 can generate the 3D model based on depth data from stereoscopic depth detection from the image data from the multiple image sensors, from a monocular depth estimation, and/or from a point cloud. In some examples, the sensor data 210 can include video frame data from at least one image sensor of the sensor(s) 205 over a period of time, and can generate the 3D model based on depth data from depth detection from the video frame data from the at least one image sensors over time.

In some examples, to detect the object in the sensor data 210, the object detector 215 is configured to track the object from a first subset of the sensor data 210 to a second subset of the sensor data 210. For instance, the first subset of the sensor data 210 can include sensor data captured by a first sensor of the sensor(s) 205, while the second subset of the sensor data 210 can include sensor data captured by a second sensor of the sensor(s) 205. Thus, the object detector 215 can track the object from the field of view of the first sensor of the sensor(s) 205 to the field of view of the second sensor of the sensor(s) 205.

The imaging system 200 includes a reprojection engine 220. The reprojection engine 220 is configured to, and can, reproject a representation of the object in the sensor data 210 (e.g., as detected via the object detector 215) from a different perspective to generate reprojected sensor data 225. The different perspectives can have different camera poses, with different camera position(s) within the environment (e.g., 3D coordinates within the 3D volume of the environment) and/or different camera orientation(s) (e.g., pitch, yaw, and/or roll) within the environment. For instance, the object may be represented (e.g., depicted) from a first perspective in the sensor data 210. The reprojection engine 220 can generate reprojected sensor data 225 that represents the object from a second perspective that is distinct from the first perspective. For instance, examples in which the sensor data 210 includes an image depicting the object from the first perspective, the reprojected sensor data 225 may include a reprojected image that depicts the object from the second perspective. In some examples, the second perspective is directed in a direction that is perpendicular to a surface of the object (e.g., to obtain a clear view of the surface of the object), while the first perspective is directed in a direction that is not perpendicular to the surface of the object (e.g., with a less clear view of the surface of the object). In some examples, the second perspective is directed in a direction that is parallel to a surface of the object, while the first perspective is directed in a direction that is not parallel to the surface of the object. In some examples, the second perspective is directed in a direction that between the perpendicular perspective discussed above and the parallel perspective discussed above, while the first perspective is directed in a different direction. In some examples, the reprojection engine 220 uses probabilistic reprojection to perform reprojection of the sensor data 210 to generate the reprojected sensor data 225. In some examples, the reprojection engine 220 uses one or more of the trained ML model(s) 250 to perform reprojection of the sensor data 210 to generate the reprojected sensor data 225. Within FIG. 2, a graphic representing the reprojection engine 220 illustrates a camera directed at an object (a toy firetruck) from a first camera pose (represented by a camera icon with a "1") corresponding to the first perspective, with an arrow from the camera to a virtual camera directed at the object from a second camera pose (represented by a camera icon with a "2") corresponding to the second perspective. Within FIG. 2, a graphic representing the reprojected sensor data 225 illustrates the object (the toy firetruck) that is depicted in the sensor data 210, but depicted from the second perspective illustrated in the graphic representing the reprojection engine 220. The second perspective illustrated in the graphics representing the reprojection engine 220 and the reprojected sensor data 225 are illustrated as being perpendicular (or nearly perpendicular) to the surface of the right side of the object (the toy firetruck). The portion of the object that the virtual camera is to observe can be planar, polygonal, polyhedral, rounded, concave, convex, another shape, or a combination thereof.

In some examples, the reprojection engine 220 performs reprojection by inputting the sensor data 210 (e.g., and an indication of the second perspective) into one or more of the trained ML model(s) 250 discussed herein, and receiving an output from the trained ML model(s) 250 that includes the reprojected sensor data 225 representing the object from the second perspective. The trained ML model(s) 250 can be trained (e.g., by imaging system 200) for use by the reprojection engine 220 using training data that includes multiple representations of an object from multiple different perspectives, such as the first perspective and the second perspective discussed above. The different perspectives can have different camera poses, with different camera position(s) within the environment (e.g., 3D coordinates within the 3D volume of the environment) and/or different camera orientation(s) (e.g., pitch, yaw, and/or roll) within the environment.

In some examples, the reprojection engine 220 determines that the sensor data 210 is missing information (e.g., visual information, image information, or other sensor information) for a portion of the object that is set to be visible in the reprojected sensor data 225 according to the second perspective. The sensor data 210 can be missing the information due to an occlusion, or due to the angle of the first perspective, or due to a shadow, or some combination thereof. In some examples, the reprojection engine 220 reconstructs the missing information based on prior sensor data (e.g., prior images) of the environment that includes a representation of the portion of the object. In some examples, the missing information is missing due to an occlusion occluding the portion of the object, and the reprojection engine 220 can generate a mask associated with an occlusion over the portion of the object. In some examples, the reprojection engine 220 reconstructs the missing information by feeding the sensor data 210, and/or the prior sensor data, into the trained ML model(s) 250 that is trained to reconstruct missing data based on training data that includes images with missing data and corresponding images where the missing data is present. In some examples, the reprojection engine 220 can determine an illumination scheme illuminating the environment based on the sensor data 210, and can reconstruct the illumination scheme according to the second perspective in the reprojected sensor data 225. In some examples, the reprojection engine 220 can normalize illumination in the sensor data 210 before generating the reprojected sensor data 225 based on the sensor data 210.

The imaging system 200 includes a status detection engine 230. The status detection engine 230 is configured to, and can, determine a status of the object (that is detected using the object detector 215) based on the representation of the object in the reprojected sensor data 225. In some examples, the status detection engine 230 can determine the status of the object based also on the representation of the object in the sensor data 210. Within FIG. 2, a graphic representing the status detection engine 230 includes the graphic representing the reprojected sensor data 225 depicting the object (the toy firetruck) from the second perspective, a first status determination indicating that the object is a firetruck (represented by a fire icon), and a second status determination indicating that a siren light of the object is illuminated (represented by a siren light icon).

In some examples, the status detection engine 230 can determine the status of the object by determining a type of object, for instance by determining that the object is a person, a face, a vehicle, a computer, a device, a document, a toy, an animal, a plant, a structure, a target, a pattern, another type of object, a sub-type of one of the previously listed object types, or a combination thereof. For instance, sub-types of the vehicle type may include an automobile, a firetruck, a police vehicle, an ambulance, a taxi, an aircraft, an airplane, a helicopter, a watercraft, a boat, a submarine, or another type of vehicle. For instance, the graphic representing the status detection engine 230 illustrates a first status determination that indicates that a type of the object is a firetruck, as represented by a fire icon. In some examples, the status detection engine 230 can include reference data (e.g., reference image(s) and/or 3D model(s)) of the object that the status detection engine 230 can use to compare the object (in the sensor data 210 and/or the reprojected sensor data 225) to, in order to determine the status of the object. For instance, the status detection engine 230 can include reference data for automobiles, which the status detection engine 230 can compare the object (in the sensor data 210 and/or the reprojected sensor data 225) to in order to determine that the object is a firetruck.

In some examples, the status detection engine 230 can determine the status of the object by determining an illumination characteristic of a light source that the object includes, and that is discernable in the reprojected sensor data 225. The illumination characteristic can include, for instance, an illumination level, an illumination color, an illumination direction, an illumination pattern, or a combination thereof. Illumination level can refer to whether the light source is disabled (turned off) or enabled (turned on). In some examples, if the light source is enabled (turned on), illumination level can also refer to different levels or degrees of illumination, luminosity, brightness, and/or power, for instance including very dim, dim, medium, bright, and very bright. Illumination color can refer to whether the light source is emitting light that is white, pink, red, orange, yellow, green, cyan, blue, indigo, violet, fuschia, another color, or a combination thereof. Illumination direction can refer to a direction that the light source emits the light and/or a direction that the light source is directed toward. Illumination pattern can refer to a pattern in the illumination level, color, and/or direction over time. Examples of illumination patterns can include steady illumination, blinking lights, lights that fade in and out, lights that maintain a single color or set of colors, lights that cycle between two or more colors or sets of colors, lights that maintain a particular direction, lights that change between two or more directions, or a combination thereof. For instance, the graphic representing the status detection engine 230 illustrates a second status determination that indicates that a siren light atop the object (the firetruck) is enabled and/or illuminated, as represented by a siren light icon. In another illustrative example, the object can be a device with one or more indicator lights (e.g., light emitting diode (LED) indicator lights), such as a modem, a router, or a computing system 1000. The status detection engine 230 can determine the status of the object by determining which of the indicator lights of the object are enabled (turned on) or disabled (turned off), what color any enabled indicator lights are emitting, what direction any enabled indicator lights are emitting light toward, and/or what illumination pattern any enabled indicator lights are illuminated according to.

Figure 5:
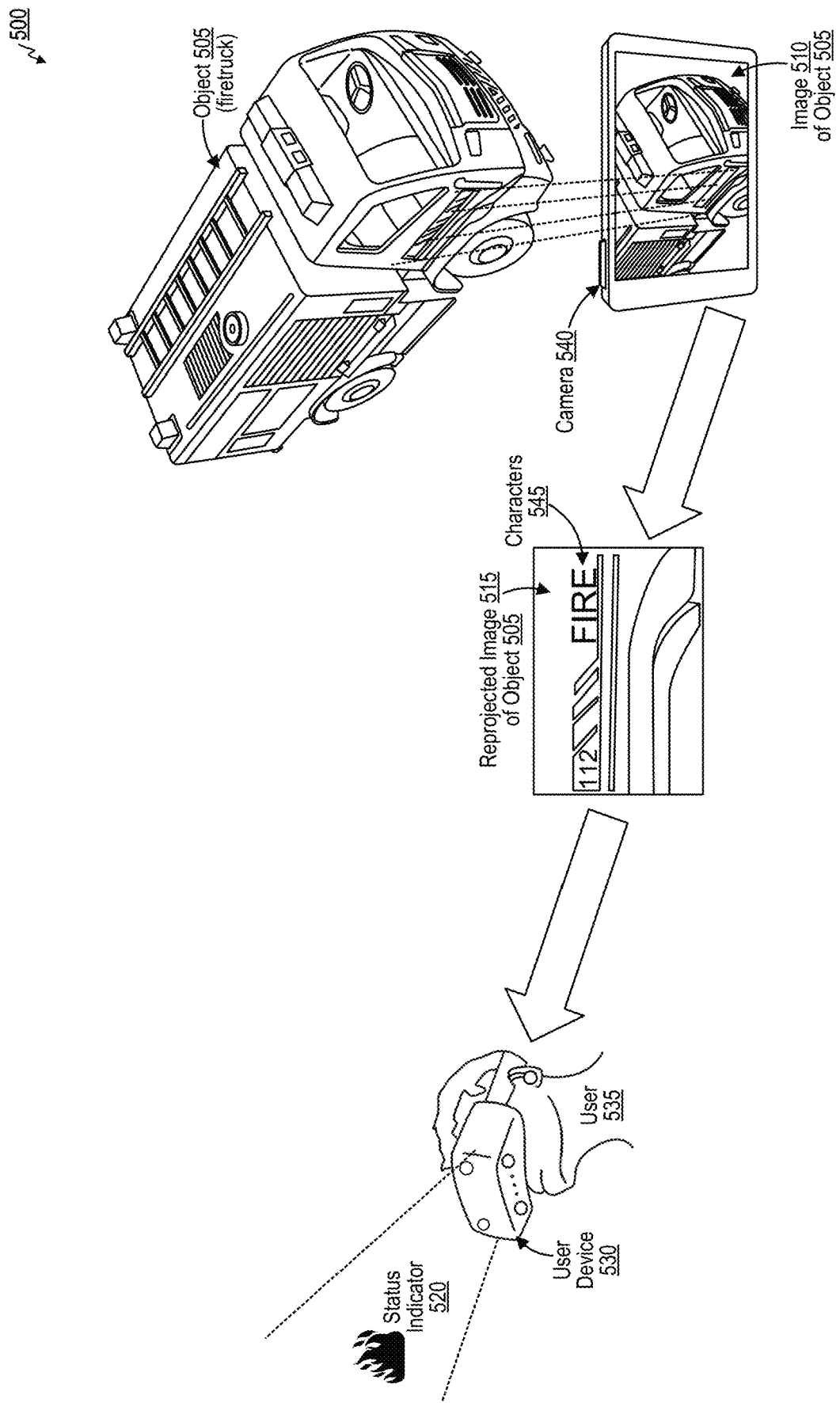
FIG. 5 is a flow diagram illustrating an imaging process that includes capture of an image of an object (a firetruck), image reprojection to generate a reprojected image of the object, and output of a status indicator indicating a status of the object, in accordance with some examples.

In some examples, the status detection engine 230 can determine the status of the object by detecting and/or parsing one or more characters (e.g., of text, numbers, symbols, logograms, hieroglyphs, and/or other character types), which may for instance be part of a string of characters. In some examples, the status detection engine 230 can detect and/or parse the character(s) using optical character recognition (OCR). In some examples, the status detection engine 230 can detect and/or parse the character(s) to determine a type of the object, for instance by detecting and/or parsing text reading "FIRE" on the side of the firetruck object to determine that the object is a firetruck as illustrated in FIG. 5 and in the first status determination in the graphic representing the status detection engine 230 as discussed above. In some examples, the object may be, or may include, a display (e.g., a display of the output device(s) 240, the display(s) 340, the display 440, and/or the output device 1035) that can display the character(s), and the status detection engine 230 can detect and/or parse the character(s) as displayed on the display of the object.

In some examples, as part of determining the status of the object, the status detection engine 230 can determine and/or detect a pose of the object, and/or changes thereto, in the reprojected sensor data 225 (e.g., or by obtaining such a determination from the object detector 215 based on the image data 210). The pose of the object can include the position of the object within the environment (e.g., 3D coordinates within the 3D volume of the environment) and/or the orientation of the object within the environment (e.g., pitch, yaw, and/or roll). In some examples, the pose of the object can also identify poses of different portions of the object relative to other portions of the object. For instance, if the object is a person, the pose of the object can also include a body pose, which can for instance indicate the respective positions and/or orientations of the person's torso, head, neck, arms, legs, hands, legs, and/or other body parts. If the object is a vehicle (such as the firetruck), the pose of the object can also include whether the doors are open or closed, whether a ladder is extended or retracted, whether a light or siren is on, or a combination thereof. In some examples the status of the object can also include changes to the pose of the object as detected using the status detection engine 230 and/or the object detector 215. For instance, the status of the object can indicate whether the firetruck (or another object) is facing a certain direction (e.g., north, south, east, or west), whether the object firetruck (or other object) has open or closed doors (or other components in certain poses or states), whether the firetruck (or other object) is turning, whether the object has fallen over or otherwise rotated about one or more axes, whether the object has is within a specific geofence area or not, whether the object has moved into or out of a specific geofence area, whether the firetruck (or other object) is moving, whether the firetruck (or other object) is accelerating, whether the firetruck (or other object) is decelerating, whether the firetruck (or other object) is moving translationally, whether a first portion of the object moving relative to a second portion of the object (e.g., a person waving their arms or turning their head, a vehicle opening its doors or rotating its wheels, etc.), or some combination thereof. In some examples, poses of specific portions of the object can also be tracked, and can be used as bases for status determinations. For instance, the status of the object can indicate how far a certain window or door of the firetruck is opened, whether or not a driver and/or passenger is sitting inside the firetruck, whether or not a driver has their arms arranged correctly at the steering wheel, and the like.

In some examples, the status detection engine 230 can determine the status of the object by detecting changes in the status of the object over time, for instance if the sensor data 210 and/or the reprojected sensor data 225 include multiple video frames of a video. Thus, the status detection engine 230 can determine the status of the object by detecting changes the type of the object, changes in an appearance of the object, changes in an illumination characteristic of a light source that the object includes, changes in character(s) detected and/or parsed from the object, changes in pose of at least a portion of the object, translational movement(s) of at least a portion of the object, rotational movement(s) of at least a portion of the object, changes in translational movement(s) of at least a portion of the object, changes in rotational movement(s) of at least a portion of the object, acceleration of translational movement(s) of at least a portion of the object, acceleration of rotational movement(s) of at least a portion of the object, changes in acceleration of translational movement(s) of at least a portion of the object, changes in acceleration of rotational movement(s) of at least a portion of the object, or a combination thereof. In some examples, changes to the appearance of the object may include changes to the shape of the object, movements of portions of the object, modification of the object, and the like. For instance, modification of the object can include application of paint to the object, application of stickers to the object, and the like.

In some examples, the status detection engine 230 can determine the status of the object based on detecting any of the characteristics of the object described above, and based on querying and/or cross-referencing the detected characteristics of the object with a data structure that can identify a status that the characteristics indicate. Examples of the data structure include a lookup table (LUT), a database, a table, a tree, a ledger, a heap, a dictionary, or another type of data structure.

In an illustrative example, the status detection engine 230 can detect, based on the reprojected sensor data 225, that an indicator light on an object (e.g., a Wi-Fi router) is blinking red. The status detection engine 230 can query a lookup table or other data structure to determine the meaning of the red blinking light indicator, for instance to determine that the red blinking light indicator means that the connection between the object (e.g., the Wi-Fi router) and a modem has been terminated. The status detection engine 230 can thus conclude that the status of the object (e.g., the Wi-Fi router) is that the connection between the object (e.g., the Wi-Fi router) and a modem has been terminated.

In another illustrative example, the status detection engine 230 can detect, based on the reprojected sensor data 225, that an object (e.g., a computer) includes a display that is displaying character(s) corresponding to an error code. The status detection engine 230 can query a lookup table or other data structure to determine the meaning of the character(s) in the error code, for instance to determine that the character(s) in the error code mean that the computer has experienced a crash. The status detection engine 230 can thus conclude that the status of the object (e.g., the computer) is that the object (e.g., the computer) has crashed.

The status detection engine 230 can generate an indicator 235 of the status of the object. The indicator 235 of the status of the object can indicate any of the types of status of the object described above. In some examples, the indicator 235 of the status of the object can include at least a portion of the reprojected sensor data 225. In some examples, the indicator 235 of the status of the object can identify the object. The imaging system 200 outputs the indicator 235, for instance by sending the indicator 235 to the output device(s) 240 of the imaging system 200. Within FIG. 2, a graphic representing the indicator 235 illustrates a rectangular box that includes the reprojected sensor data 225, a caution symbol, a fire symbol representing the first determination described above, and a siren light symbol representing the second determination described above. In some examples, the imaging system 200 can also output the reprojected sensor data 225, for instance by sending the reprojected sensor data 225 to the output device(s) 240 of the imaging system 200.

The imaging system 200 includes output device(s) 240. The output device(s) 240 can include one or more visual output devices, such as display(s) or connector(s) therefor. The output device(s) 240 can include one or more audio output devices, such as speaker(s), headphone(s), and/or connector(s) therefor. The output device(s) 240 can include one or more of the output device 1035 and/or of the communication interface 1040 of the computing system 1000. The imaging system 200 causes the display(s) of the output device 240 to display the indicator 235 (and/or the reprojected sensor data 225).

In some examples, the output device(s) 240 include one or more transceivers. The transceiver(s) can include wired transmitters, receivers, transceivers, or combinations thereof. The transceiver(s) can include wireless transmitters, receivers, transceivers, or combinations thereof. The transceiver(s) can include one or more of the output device 1035 and/or of the communication interface 1040 of the computing system 1000. In some examples, the imaging system 200 causes the transceiver(s) to send, to a recipient device, the indicator 235 (and/or the reprojected sensor data 225). The recipient device can include a display, and the data sent to the recipient device from the transceiver(s) of the output device(s) 240 can cause the display of the recipient device to display the indicator 235 (and/or the reprojected sensor data 225).

In some examples, the display(s) of the output device(s) 240 of the imaging system 200 function as optical "see-through" display(s) that allow light from the real-world environment (scene) around the imaging system 200 to traverse (e.g., pass) through the display(s) of the output device(s) 240 to reach one or both eyes of the user. For example, the display(s) of the output device(s) 240 can be at least partially transparent, translucent, light-permissive, light-transmissive, or a combination thereof. In an illustrative example, the display(s) of the output device(s) 240 includes a transparent, translucent, and/or light-transmissive lens and a projector. The display(s) of the output device(s) 240 of can include a projector that projects virtual content (e.g., the indicator 235 and/or the reprojected sensor data 225) onto the lens. The lens may be, for example, a lens of a pair of glasses, a lens of a goggle, a contact lens, a lens of a head-mounted display (HMD) device, or a combination thereof. Light from the real-world environment passes through the lens and reaches one or both eyes of the user. The projector can project virtual content (e.g., the indicator 235 and/or the reprojected sensor data 225) onto the lens, causing the virtual content to appear to be overlaid over the user's view of the environment from the perspective of one or both of the user's eyes. In some examples, the projector can project the virtual content onto the onto one or both retinas of one or both eyes of the user rather than onto a lens, which may be referred to as a virtual retinal display (VRD), a retinal scan display (RSD), or a retinal projector (RP) display.

In some examples, the display(s) of the output device(s) 240 of the imaging system 200 are digital "pass-through" display that allow the user of the imaging system 200 to see a view of an environment by displaying the view of the environment on the display(s) of the output device(s) 240. The view of the environment that is displayed on the digital pass-through display can be a view of the real-world environment around the imaging system 200, for example based on sensor data (e.g., images, videos, depth images, point clouds, other depth data, or combinations thereof) captured by one or more environment-facing sensors of the sensor(s) 205, in some cases as modified using the avatar processor 260 (e.g., the indicator 235 and/or the reprojected sensor data 225). The view of the environment that is displayed on the digital pass-through display can be a virtual environment (e.g., as in VR), which may in some cases include elements that are based on the real-world environment (e.g., boundaries of a room). The view of the environment that is displayed on the digital pass-through display can be an augmented environment (e.g., as in AR) that is based on the real-world environment. The view of the environment that is displayed on the digital pass-through display can be a mixed environment (e.g., as in MR) that is based on the real-world environment. The view of the environment that is displayed on the digital pass-through display can include virtual content (e.g., the indicator 235 and/or the reprojected sensor data 225) overlaid over other otherwise incorporated into the view of the environment.

The trained ML model(s) 250 can include one or more neural networks (NNs) (e.g., neural network 800), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), transformer networks, one or more other types of neural networks, one or more trained support vector machines (SVMs), one or more trained random forests (RFs), one or more computer vision systems, one or more deep learning systems, or combinations thereof.

Within FIG. 2, a graphic representing the trained ML model(s) 250 illustrates a set of circles connected to another. Each of the circles can represent a node (e.g., node 816), a neuron, a perceptron, a layer, a portion thereof, or a combination thereof. The circles are arranged in columns. The leftmost column of white circles represent an input layer (e.g., input layer 810). The rightmost column of white circles represent an output layer (e.g., output layer 814). Two columns of shaded circled between the leftmost column of white circles and the rightmost column of white circles each represent hidden layers (e.g., hidden layers 812A-812N).

In some examples, the imaging system 200 includes a feedback engine 255. The feedback engine 255 can detect feedback received from a user interface of the imaging system 200. The feedback may include feedback on the object detection by the object detector 215, the reprojected sensor data 225, the object status detection, and/or the indicator 235, output(s) by the output device(s) 240, or a combination thereof. The feedback engine 255 can detect feedback about one engine of the imaging system 200 received from another engine of the imaging system 200, for instance whether one engine decides to use data from the other engine or not. The feedback received by the feedback engine 255 can be positive feedback or negative feedback. For instance, if the one engine of the imaging system 200 uses data from another engine of the imaging system 200, or if positive feedback from a user is received through a user interface, the feedback engine 255 can interpret this as positive feedback. If the one engine of the imaging system 200 declines to data from another engine of the imaging system 200, or if negative feedback from a user is received through a user interface, the feedback engine 255 can interpret this as negative feedback. Positive feedback can also be based on attributes of the sensor data from the sensor(s) 205, such as the user smiling, laughing, nodding, saying a positive statement (e.g., "yes," "confirmed," "okay," "next"), or otherwise positively reacting to an output of one of the engines described herein, or an indication thereof. Negative feedback can also be based on attributes of the sensor data from the sensor(s) 205, such as the user frowning, crying, shaking their head (e.g., in a "no" motion), saying a negative statement (e.g., "no," "negative," "bad," "not this"), or otherwise negatively reacting to an output of one of the engines described herein, or an indication thereof.

In some examples, the feedback engine 255 provides the feedback to one or more ML systems of the imaging system 200 as training data to update the one or more trained ML model(s) 250 of the imaging system 200. For instance, the feedback engine 255 can provide the feedback as training data to the ML system(s) and/or the trained ML model(s) 250 to update the training for the object detector 215, the reprojection engine 220, the status detection engine 230, or a combination thereof. Positive feedback can be used to strengthen and/or reinforce weights associated with the outputs of the ML system(s) and/or the trained ML model(s) 250, and/or to weaken or remove other weights other than those associated with the outputs of the ML system(s) and/or the trained ML model(s) 250. Negative feedback can be used to weaken and/or remove weights associated with the outputs of the ML system(s) and/or the trained ML model(s) 250, and/or to strengthen and/or reinforce other weights other than those associated with the outputs of the ML system(s) and/or the trained ML model(s) 250. In some examples, the feedback engine 255 can be used to enable or disable various virtual cameras (e.g., virtual camera 610) or perspectives based on various rules, logic, or input from a user interface.

In some examples, certain elements of the imaging system 200 (e.g., the object detector 215, the reprojection engine 220, the status detection engine 230, the output device(s)

240, the trained ML model(s) 250, the feedback engine 255, or a combination thereof) include a software element, such as a set of instructions corresponding to a program, that is run on a processor such as the processor 1010 of the computing system 1000, the image processor 150, the host processor 152, the ISP 154, or a combination thereof. In some examples, these elements of the imaging system 200 include one or more hardware elements, such as a specialized processor (e.g., the processor 1010 of the computing system 1000, the image processor 150, the host processor 152, the ISP 154, or a combination thereof). In some examples, these elements of the imaging system 200 can include a combination of one or more software elements and one or more hardware elements.

Figure 3A:
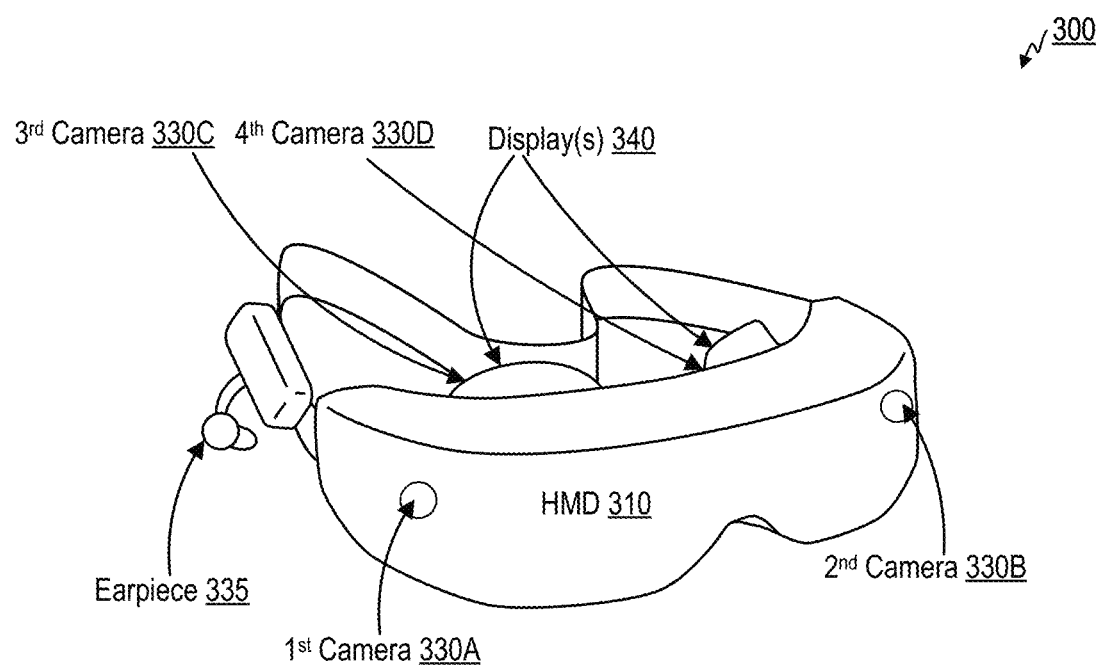
FIG. 3A is a perspective diagram illustrating a head-mounted display (HMD) that is used as part of an imaging system, in accordance with some examples.

FIG. 3A is a perspective diagram 300 illustrating a head-mounted display (HMD) 310 that is used as part of an imaging system 200. The HMD 310 may be, for example, an augmented reality (AR) headset, a virtual reality (VR) headset, a mixed reality (MR) headset, an extended reality (XR) headset, or some combination thereof. The HMD 310 may be an example of an imaging system 200. The HMD 310 includes a first camera 330A and a second camera 330B along a front portion of the HMD 310. The first camera 330A and the second camera 330B may be examples of sensor(s) 205 of the imaging system 200. The HMD 310 includes a third camera 330C and a fourth camera 330D facing the eye(s) of the user as the eye(s) of the user face the display(s) 340. The third camera 330C and the fourth camera 330D may be examples of the sensor(s) 205 of the imaging system 200. In some examples, the HMD 310 may only have a single camera with a single image sensor. In some examples, the HMD 310 may include one or more additional cameras in addition to the first camera 330A, the second camera 330B, third camera 330C, and the fourth camera 330D. In some examples, the HMD 310 may include one or more additional sensors in addition to the first camera 330A, the second camera 330B, third camera 330C, and the fourth camera 330D, which may also include other types of sensor(s) 205 of the imaging system 200. In some examples, the first camera 330A, the second camera 330B, third camera 330C, and/or the fourth camera 330D may be examples of the image capture and processing system 100, the image capture device 105A, the image processing device 105B, or a combination thereof.

The HMD 310 may include one or more displays 340 that are visible to a user 320 wearing the HMD 310 on the user 320's head. The one or more displays 340 of the HMD 310 can be examples of the one or more displays of the output device(s) 240 of the imaging system 200. In some examples, the HMD 310 may include one display 340 and two viewfinders. The two viewfinders can include a left viewfinder for the user 320's left eye and a right viewfinder for the user 320's right eye. The left viewfinder can be oriented so that the left eye of the user 320 sees a left side of the display. The right viewfinder can be oriented so that the right eye of the user 320 sees a right side of the display. In some examples, the HMD 310 may include two displays 340, including a left display that displays content to the user 320's left eye and a right display that displays content to a user 320's right eye. The one or more displays 340 of the HMD 310 can be digital "pass-through" displays or optical "see-through" displays. In some examples, the one or more displays 340 of the HMD 310 can display the sensor data 210, the reprojected sensor data 225, the indicator 235, or a combination thereof.

Figure 3B:
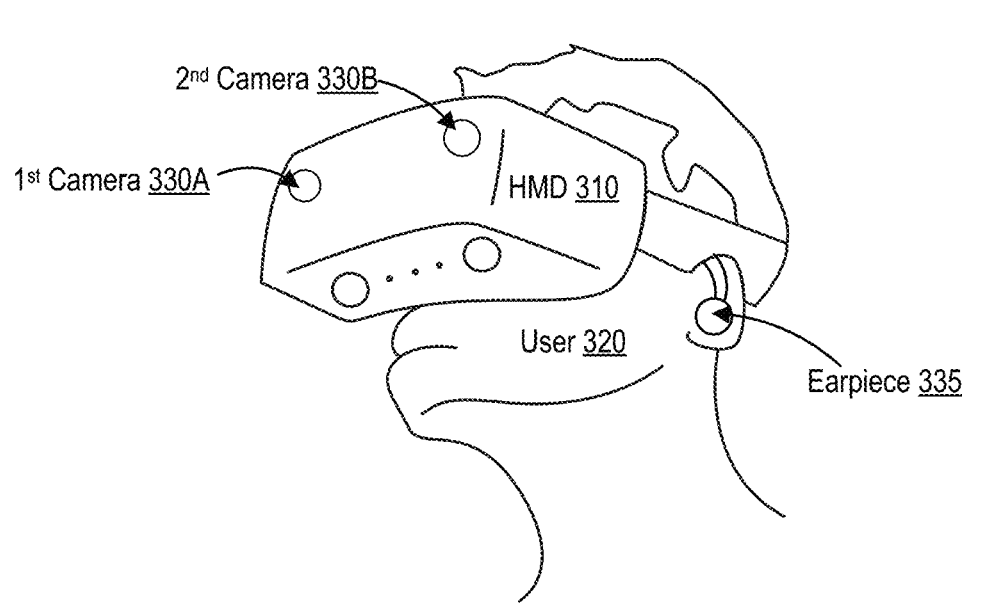
FIG. 3B is a perspective diagram illustrating the head-mounted display (HMD) of FIG. 3A being worn by a user, in accordance with some examples.

The HMD 310 may include one or more earpieces 335, which may function as speakers and/or headphones that output audio to one or more ears of a user of the HMD 310, and may be examples of output device(s) 240. One earpiece 335 is illustrated in FIGS. 3A and 3B, but it should be understood that the HMD 310 can include two earpieces, with one earpiece for each ear (left ear and right ear) of the user. In some examples, the HMD 310 can also include one or more microphones (not pictured). In some examples, the audio output by the HMD 310 to the user through the one or more earpieces 335 may include, or be based on, audio recorded using the one or more microphones.

FIG. 3B is a perspective diagram 350 illustrating the head-mounted display (HMD) of FIG. 3A being worn by a user 320. The user 320 wears the HMD 310 on the user 320's head over the user 320's eyes. The HMD 310 can capture images with the first camera 330A and the second camera 330B. In some examples, the HMD 310 displays one or more output images toward the user 320's eyes using the display(s) 340. In some examples, the output images can include the reprojected sensor data 225 and/or the indicator 235. The output images can be based on the images captured by the first camera 330A and the second camera 330B (e.g., the sensor data 210), for example with the virtual content (e.g., the reprojected sensor data 225 and/or the indicator 235) overlaid. The output images may provide a stereoscopic view of the environment, in some cases with the virtual content overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid virtual content in the display images overlaid over the images captured by the first camera 330A and the second camera 330B. The third camera 330C and the fourth camera 330D can capture images of the eyes of the before, during, and/or after the user views the display images displayed by the display(s) 340. This way, the sensor data from the third camera 330C and/or the fourth camera 330D can capture reactions to the virtual content by the user's eyes (and/or other portions of the user). An earpiece 335 of the HMD 310 is illustrated in an ear of the user 320. The HMD 310 may be outputting audio to the user 320 through the earpiece 335 and/or through another earpiece (not pictured) of the HMD 310 that is in the other ear (not pictured) of the user 320.

Figure 4A:
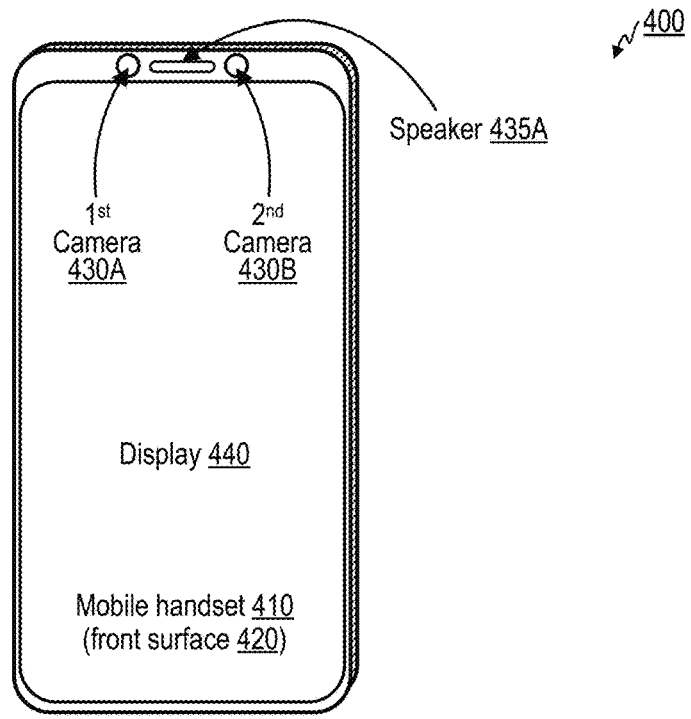
FIG. 4A is a perspective diagram illustrating a front surface of a mobile handset that includes front-facing cameras and that can be used as part of an imaging system, in accordance with some examples.

FIG. 4A is a perspective diagram 400 illustrating a front surface of a mobile handset 410 that includes front-facing cameras and can be used as part of an imaging system 200. The mobile handset 410 may be an example of an imaging system 200. The mobile handset 410 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 420 of the mobile handset 410 includes a display 440. The front surface 420 of the mobile handset 410 includes a first camera 430A and a second camera 430B. The first camera 430A and the second camera 430B may be examples of the sensor(s) 205 of the imaging system 200. The first camera 430A and the second camera 430B can face the user, including the eye(s) of the user, while content (e.g., the reprojected sensor data 225 and/or the indicator 235) is displayed on the display 440. The display 440 may be an example of the display(s) of the output device(s) 240 of the imaging system 200.

The first camera 430A and the second camera 430B are illustrated in a bezel around the display 440 on the front surface 420 of the mobile handset 410. In some examples, the first camera 430A and the second camera 430B can be positioned in a notch or cutout that is cut out from the display 440 on the front surface 420 of the mobile handset 410. In some examples, the first camera 430A and the second camera 430B can be under-display cameras that are positioned between the display 440 and the rest of the mobile handset 410, so that light passes through a portion of the display 440 before reaching the first camera 430A and the second camera 430B. The first camera 430A and the second camera 430B of the perspective diagram 400 are front-facing cameras. The first camera 430A and the second camera 430B face a direction perpendicular to a planar surface of the front surface 420 of the mobile handset 410. The first camera 430A and the second camera 430B may be two of the one or more cameras of the mobile handset 410. In some examples, the front surface 420 of the mobile handset 410 may only have a single camera.

In some examples, the display 440 of the mobile handset 410 displays one or more output images toward the user using the mobile handset 410. In some examples, the output images can include the reprojected sensor data 225 and/or the indicator 235. The output images can be based on the images captured by the first camera 430A, the second camera 430B, the third camera 430C, and/or the fourth camera 430D (e.g., the sensor data 210), for example with the virtual content (e.g., the reprojected sensor data 225 and/or the indicator 235) overlaid. In some examples, the display 440 of the mobile handset 410 can display the sensor data 210, the reprojected sensor data 225, the indicator 235, or a combination thereof.

In some examples, the front surface 420 of the mobile handset 410 may include one or more additional cameras in addition to the first camera 430A and the second camera 430B. The one or more additional cameras may also be examples of the sensor(s) 205 of the imaging system 200. In some examples, the front surface 420 of the mobile handset 410 may include one or more additional sensors in addition to the first camera 430A and the second camera 430B. The one or more additional sensors may also be examples of the sensor(s) 205 of the imaging system 200. In some cases, the front surface 420 of the mobile handset 410 includes more than one display 440. The one or more displays 440 of the front surface 420 of the mobile handset 410 can be examples of the display(s) of the output device(s) 240 of the imaging system 200. For example, the one or more displays 440 can include one or more touchscreen displays.

The mobile handset 410 may include one or more speakers 435A and/or other audio output devices (e.g., earphones or headphones or connectors thereto), which can output audio to one or more ears of a user of the mobile handset 410. One speaker 435A is illustrated in FIG. 4A, but it should be understood that the mobile handset 410 can include more than one speaker and/or other audio device. In some examples, the mobile handset 410 can also include one or more microphones (not pictured). In some examples, the mobile handset 410 can include one or more microphones along and/or adjacent to the front surface 420 of the mobile handset 410, with these microphones being examples of the sensor(s) 205 of the imaging system 200. In some examples, the audio output by the mobile handset 410 to the user through the one or more speakers 435A and/or other audio output devices may include, or be based on, audio recorded using the one or more microphones.

Figure 4B:
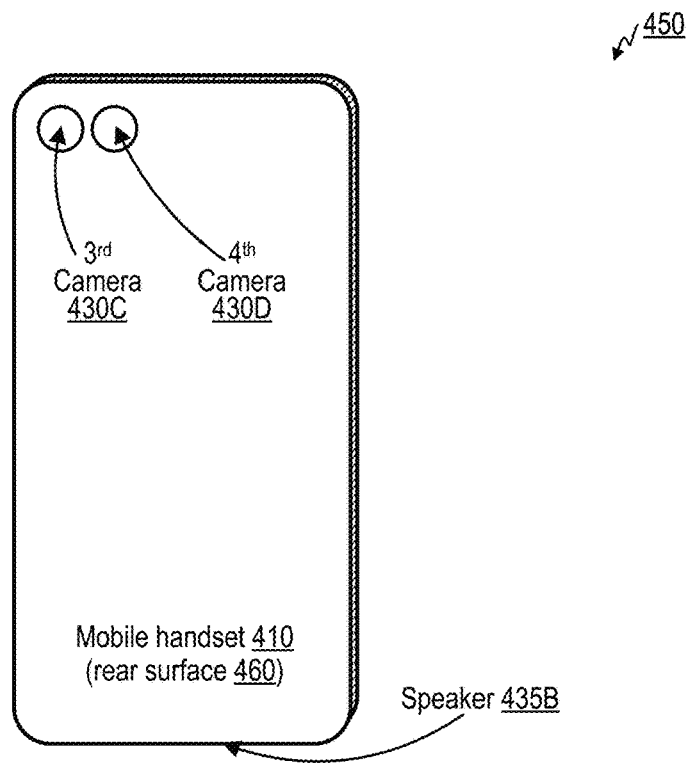
FIG. 4B is a perspective diagram illustrating a rear surface of a mobile handset that includes rear-facing cameras and that can be used as part of an imaging system, in accordance with some examples.

FIG. 4B is a perspective diagram 450 illustrating a rear surface 460 of a mobile handset that includes rear-facing cameras and that can be used as part of an imaging system 200. The mobile handset 410 includes a third camera 430C and a fourth camera 430D on the rear surface 460 of the mobile handset 410. The third camera 430C and the fourth camera 430D of the perspective diagram 450 are rear-facing. The third camera 430C and the fourth camera 430D may be examples of the sensor(s) 205 of the imaging system 200. The third camera 430C and the fourth camera 430D face a direction perpendicular to a planar surface of the rear surface 460 of the mobile handset 410.

The third camera 430C and the fourth camera 430D may be two of the one or more cameras of the mobile handset 410. In some examples, the rear surface 460 of the mobile handset 410 may only have a single camera. In some examples, the rear surface 460 of the mobile handset 410 may include one or more additional cameras in addition to the third camera 430C and the fourth camera 430D. The one or more additional cameras may also be examples of the sensor(s) 205 of the imaging system 200. In some examples, the rear surface 460 of the mobile handset 410 may include one or more additional sensors in addition to the third camera 430C and the fourth camera 430D. The one or more additional sensors may also be examples of the sensor(s) 205 of the imaging system 200. In some examples, the first camera 430A, the second camera 430B, third camera 430C, and/or the fourth camera 430D may be examples of the image capture and processing system 100, the image capture device 105A, the image processing device 105B, or a combination thereof.

The mobile handset 410 may include one or more speakers 435B and/or other audio output devices (e.g., earphones or headphones or connectors thereto), which can output audio to one or more ears of a user of the mobile handset 410. One speaker 435B is illustrated in FIG. 4B, but it should be understood that the mobile handset 410 can include more than one speaker and/or other audio device. In some examples, the mobile handset 410 can also include one or more microphones (not pictured). In some examples, the mobile handset 410 can include one or more microphones along and/or adjacent to the rear surface 460 of the mobile handset 410, with these microphones being examples of the sensor(s) 205 of the imaging system 200. In some examples, the audio output by the mobile handset 410 to the user through the one or more speakers 435B and/or other audio output devices may include, or be based on, audio recorded using the one or more microphones.

The mobile handset 410 may use the display 440 on the front surface 420 as a pass-through display. For instance, the display 440 may display output images, such as the reprojected sensor data 225 and/or the indicator 235. The output images can be based on the images (e.g. the sensor data 210) captured by the third camera 430C and/or the fourth camera 430D, for example with the virtual content (e.g., (e.g., the reprojected sensor data 225 and/or the indicator 235) overlaid. The first camera 430A and/or the second camera 430B can capture images of the user's eyes (and/or other portions of the user) before, during, and/or after the display of the output images with the virtual content on the display 440. This way, the sensor data from the first camera 430A and/or the second camera 430B can capture reactions to the virtual content by the user's eyes (and/or other portions of the user).

FIG. 5 is a flow diagram illustrating an imaging process 500 that includes capture of an image 510 of an object 505 (a firetruck), image reprojection to generate a reprojected image 515 of the object 505, and output of a status indicator 520 indicating a status of the object 505. A device with a camera 540 is illustrated capturing the image 510 of the object 505. The camera 540 is an example of the image capture and processing system 100, the image capture device 105A, the image processing device 105B, the image sensor 130, the sensor(s) 205, image sensor(s) of any of cameras 330A-330D, image sensor(s) of any of cameras 430A-430D, the camera 740, the image sensor of the imaging process 900, an image sensor of an input device 1045, or a combination thereof.

An object detector 215 of the imaging system 200 (e.g., the device with the camera 540, a user device 530, and/or another computing system 1000 associated with these devices) can detect the object 505 as depicted within the image 510. In some examples, the object detector 215 can generate a 3D model of the object 505, including a mesh and/or a texture to apply to the mesh, based on the image 510. The object detector 215 can generate the 3D model of the object 505 based on depth data obtained using the camera 540 and/or other components of the device with the camera 540. For instance, the device with the camera 540 can obtain depth data from a depth sensor of the device that captures depth data, and/or additional camera(s) beyond the camera 540 (e.g., that the object detector 215 can use to perform stereoscopic depth detection and/or monocular depth estimation), and/or can capture multiple video frames including the image 510 (e.g., that the object detector 215 can use to perform video-based depth detection).

A reprojection engine 220 of the imaging system 200 (e.g., the device with the camera 540, a user device 530, and/or another computing system 1000 associated with these devices) can generate a reprojected image 515 of the object 505 based on the image 510 of the object 505. The image 510 of the object 505 is captured from a first perspective corresponding to the pose, field of view, and/or viewport of the camera 540. The reprojection engine 220 can reproject according to a configured pose (e.g., position and/or orientation) of a virtual camera (e.g., virtual camera 610) so that the viewport and/or field of view of the virtual camera corresponds to the second perspective depicted in the reprojected image 515 of the object 505. The reprojected image 515 of the object 505 thus simulates an image captured by the virtual camera, from the perspective and field of view of the virtual camera. In some examples, the pose of the virtual camera can be determined using the object detector 215 and/or the reprojection engine 220. The pose of the virtual camera, and/or the second perspectives, can be object-locked, so that the pose of the virtual camera is locked in a specified pose relative to at least a portion of the object, even if the object moves relative to other parts of the environment. The pose of the virtual camera, and/or the second perspectives, can be region-locked, so that the virtual camera is locked in a specific pose relative to a region of interest (e.g., of the object, of the environment, of the sensor data 210, or a combination thereof), even if the region of interest moves relative to other regions. The pose of the virtual camera, and/or the second perspectives, can be world-locked or environment-locked, so that the virtual camera is locked in a specific pose relative to the at least a portion of the environment, scene, and/or world, even if the object moves relative to the environment, scene, and/or world (e.g., even if the object leaves the field of view). The pose of the virtual camera, and/or the second perspectives, can be locked to a texture, a feature, a corner, a contour, a blob, an edge, a floor, a wall, a ceiling, a door, or a combination thereof.

Figure 6:
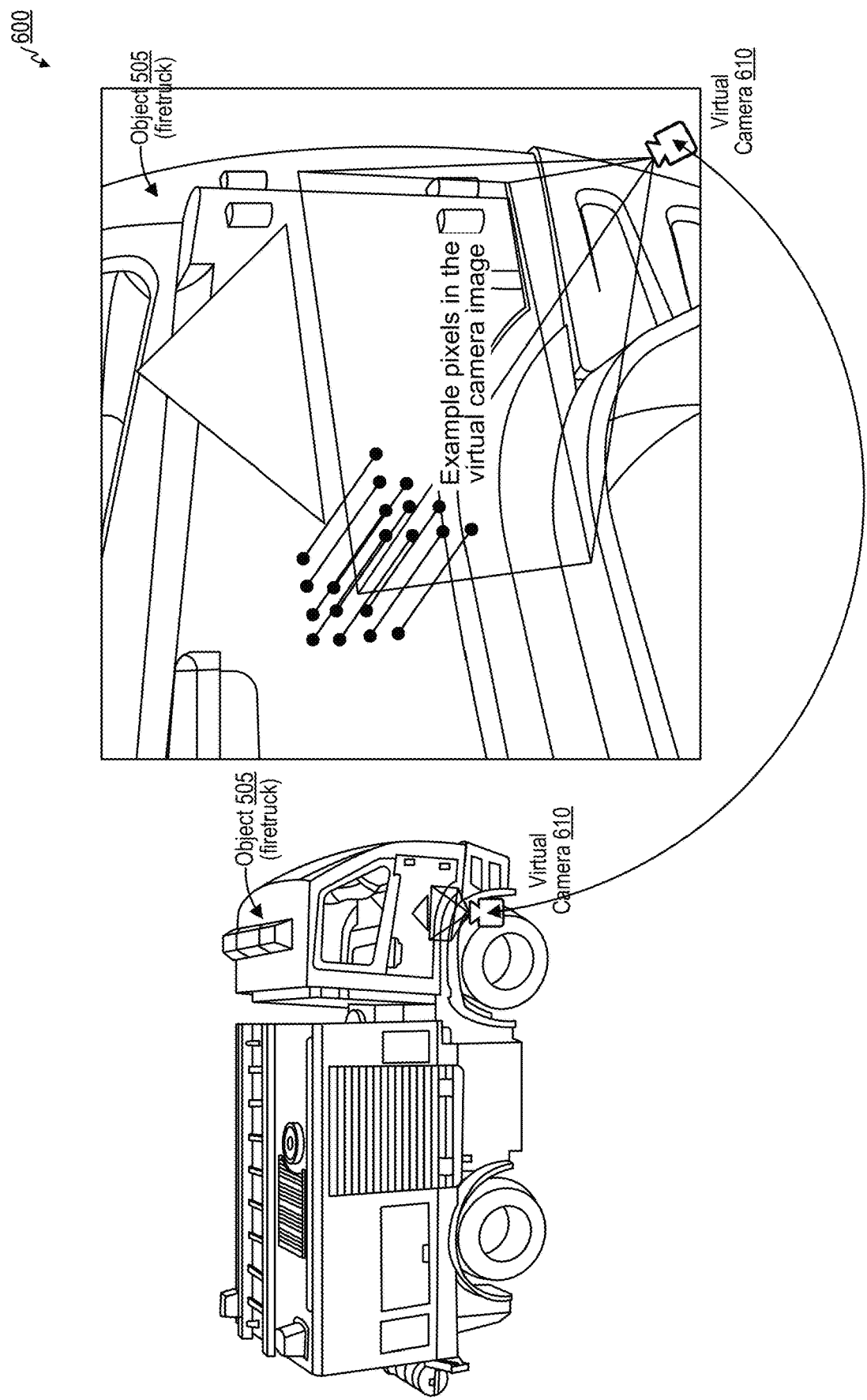
FIG. 6 is a conceptual diagram illustrating a field of view of a virtual camera associated with image reprojection, in accordance with some examples.

FIG. 6 is a conceptual diagram 600 illustrating a viewport and/or field of view of a virtual camera associated with image reprojection. For instance, the virtual camera 610 is an example of the virtual camera used by the reprojection engine 220 of the imaging system 200 of FIG. 5 (e.g., the device with the camera 540, a user device 530, and/or another computing system 1000 associated with these devices) to generate the reprojected image 515 of the object 505 based on the image 510 of the object 505. In some examples, the reprojection engine 220 defines the virtual camera 610 using a pose (e.g., a position and/or orientation) of the virtual camera 610 (e.g., relative to the object 505), a resolution (e.g., image resolution) of the virtual camera, a camera projection type (e.g., projective and/or orthogonal) of the virtual camera, a distortion model (e.g., radial/tangential model, distortion model, equidistant distortion model, or a combination thereof), a projection matrix of the virtual camera 610, or a combination thereof. The orientation of the virtual camera 610 can indicate a direction that the virtual camera 610 is facing. For instance, the virtual camera 610 is directed in a direction that is perpendicular, or orthogonal, to a surface of the side of the object 505.

The reprojection engine 220 of the imaging system 200 of FIG. 5 (e.g., the device with the camera 540, a user device 530, and/or another computing system 1000 associated with these devices) can calculate a static mapping for each pixel of the virtual camera 610 (e.g., each pixel of the reprojected image 515) to a 3D point on a surface of the object 505 (e.g., on the generated 3D model of the object 505 and/or on a surface of the object 505 as depicted in the image 510). Given the known pose of the camera 540 (e.g., from tracking the movement of the camera 540 and/or its device based on the image 510), the reprojection engine 220 can project every 3D point from the image 510 to the virtual camera 610 and/or the reprojected image 515. For this projection, the reprojection engine 220 can use the 3D model for an occlude or occlusion mapping, to determine if any portions of the object 505 are to be occluded in the reprojected image 515, and to verify whether certain points are to be visible or occluded in the reprojected image 515 as a result. Using pixel-surface mapping and surface projection, the reprojection engine 220 can aggregate pixel values (e.g., luminosity values and/or color values) of the pixels to be discernable by the virtual camera 610 as the reprojected image 515. In some examples, the reprojection engine 220 uses probabilistic reprojection to perform reprojection of the image 510 to generate the reprojected image 515. In some examples, the reprojection engine 220 uses one or more of the trained ML model(s) 250 to perform reprojection of the image 510 to generate the reprojected image 515.

To assist with detection of object status by the status detection engine 230, the reprojection engine 220 can update the reprojected image 515 with any changes to pixel values (e.g., luminosity values and/or color values) of the pixels of the image 510 over time (e.g., if the camera 540 is capturing the image 510 as a video frame in a video). This way, the status detection engine 230 of the imaging system 200 of FIG. 5 (e.g., the device with the camera 540, a user device 530, and/or another computing system 1000 associated with these devices) can detect changes to luminosity of a portion of the object 505 and/or to detect changes to color of a portion of the object 505. For instance, detecting changes to luminosity can help detect whether a light source of the object 505 was disabled, enabled, or otherwise changed illumination level, or other modifications to the appearance of the object 505. Detecting changes to color can help detect whether a light source of the object 505 changed illumination color, or other modifications to the appearance of the object 505.

In the context of FIGS. 5 and 6, the status detection engine 230 of the imaging system 200 of FIG. 5 (e.g., the device with the camera 540, a user device 530, and/or another computing system 1000 associated with these devices) can use the reprojected image 515 generated by the reprojection engine 220 to detect and/or parse (e.g., using OCR) a string of characters 545 reading "FIRE" on the side surface of the object 505 (the firetruck), indicating that the object 505 is a firetruck. The status detection engine 230 can generate a status indicator 520 and use output device(s) 240 to send the status indicator 520 to the user device 530 and cause the user device 530 to output the status indicator 520 to the user 535. The status indicator 520 can, in some examples, indicate that the object 505 is a firetruck. The status indicator 520 can, in some examples, indicate that the object 505 includes the string of characters 545 reading "FIRE" on its side surface. The status indicator 520 can, in some examples, include at least a portion of the reprojected image 515 of the object 505.

In some examples, the appearance of the characters 545, and/or of the illustrated design that the characters 545 are a part of, may be a change in the appearance of the object 505 (in comparison to previous images of the object 505) that is detected by the status detection engine 230 and indicated in the status indicator 520. For instance, in an illustrative example, a sticker or paint may be applied to the object 505 to add the characters 545, and/or of the illustrated design that the characters 545 are a part of, to the object 505. The status indicator 520 can detect the change in the appearance of the object, in particular the addition of the characters 545, and/or of the illustrated design that the characters 545 are a part of, to the object 505 (e.g., via the sticker and/or the paint applied to the object 505). The status indicator 520 generated using the status detection engine 230 can indicate this change in the appearance of the object to the user device 530 and/or the user 535.

In some examples, the device that incudes the camera 540 is different from the user device 530. This way, the user 535 using the user device can keep track of the status of the object 505 via the status indicator 520 even if the user 535 and user device 530 are remote from the device with the camera 540. In some examples, the user device 530 includes the camera 540. Examples of the user device 530, and/or of the device with the camera 540, include the image capture and processing system 100, the image capture device 105A, the image processing device 105B, the HMD 310, the mobile handset 410, an imaging system that performs the imaging process 700 of FIG. 7, the neural network 800, an imaging system that performs the imaging process 900 of FIG. 9, the computing system 1000, or a combination thereof.

Figure 7:
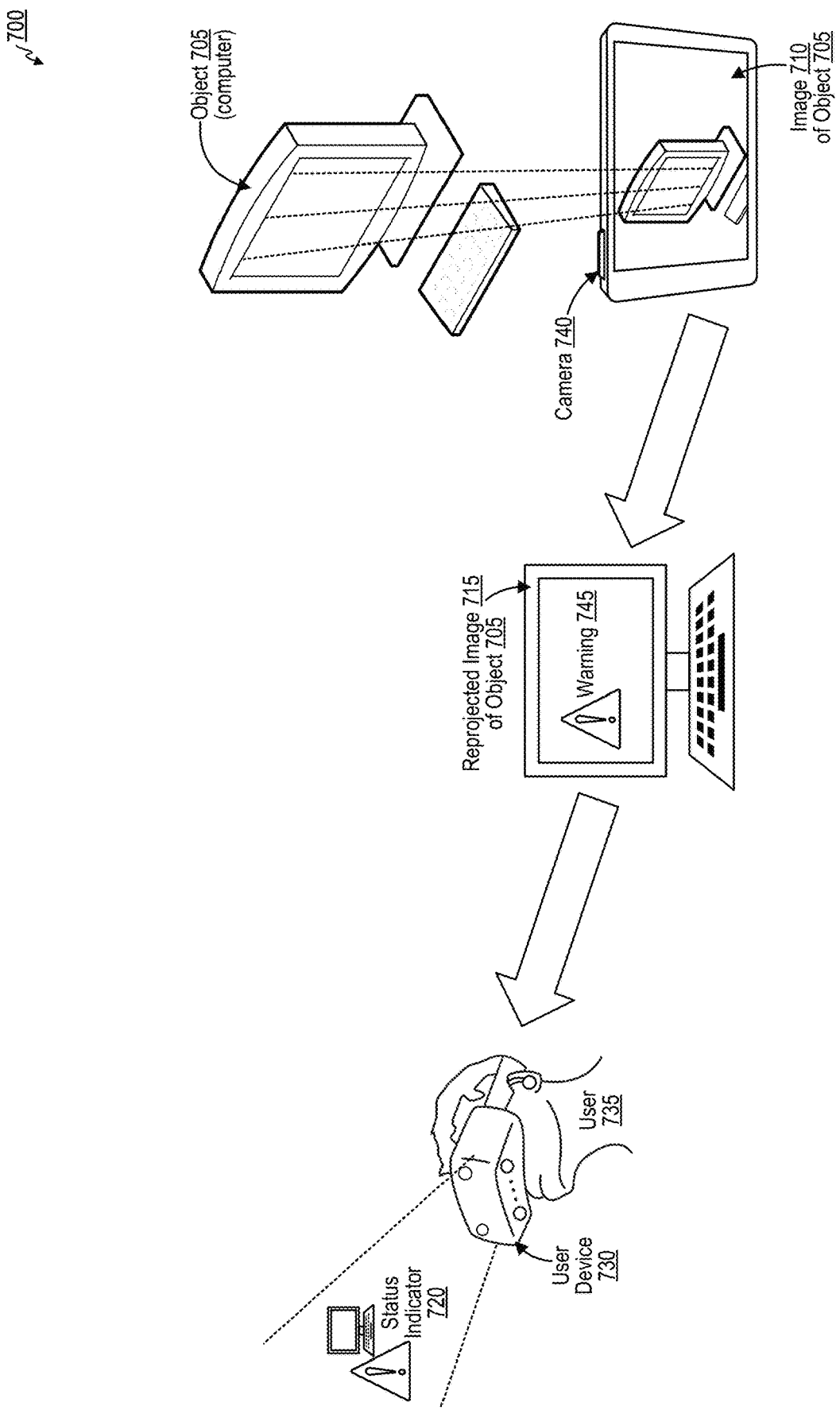
FIG. 7 is a flow diagram illustrating an imaging process that includes capture of an image of an object (a computer), image reprojection to generate a reprojected image of the object, and output of a status indicator indicating a status of the object, in accordance with some examples.

FIG. 7 is a flow diagram illustrating an imaging process 700 that includes capture of an image 710 of an object 705 (a computer), image reprojection to generate a reprojected image 715 of the object 705, and output of a status indicator 720 indicating a status of the object 705. A device with a camera 740 is illustrated capturing the image 710 of the object 705. The camera 740 is an example of the image capture and processing system 100, the image capture device 105A, the image processing device 105B, the image sensor 130, the sensor(s) 205, image sensor(s) of any of cameras 330A-330D, image sensor(s) of any of cameras 430A-430D, the camera 540, the image sensor of the imaging process 900, an image sensor of an input device 1045, or a combination thereof. An object detector 215 of the imaging system 200 (e.g., the device with the camera 740, a user device 730, and/or another computing system 1000 associated with these devices) can detect the object 705 (the computer) as depicted within the image 710. The object detector 215 can generate a 3D model of the object 705, including a mesh and/or a texture to apply to the mesh, based on the image 710 and/or corresponding depth data.

The reprojection engine 220 of the imaging system 200 (e.g., the device with the camera 740, a user device 730, and/or another computing system 1000 associated with these devices) can generate the reprojected image 715 of the object 705 based on the image 710 of the object 705, for instance using probabilistic reprojection and/or trained ML model(s) 250 as described herein. The reprojected image 715 of the object 705 depicts the object 705 from a perspective of the virtual camera corresponding to the field of view of the virtual camera. The image 710 of the object 705 is captured from a first perspective corresponding to the field of view of the camera 740. The reprojection engine 220 can reproject according to a configured pose (e.g., position and/or orientation) of a virtual camera with a viewport and/or field of view corresponding to the second perspective depicted in the reprojected image 715 of the object 705. The reprojected image 715 of the object 705 thus simulates an image captured by the virtual camera, from the perspective and field of view of the virtual camera. The orientation portion of the pose of the virtual camera defines and/or indicates a direction that the virtual camera is facing (e.g., relative to the object 505). For instance, the virtual camera in FIG. 7 is directed in a direction that is perpendicular, or orthogonal, to a surface of the monitor of the object 705 (the computer).

To assist with detection of object status by the status detection engine 230, the reprojection engine 220 can update the reprojected image 715 with any changes to pixel values (e.g., luminosity values and/or color values) of the pixels of the image 710 over time (e.g., if the camera 740 is capturing the image 710 as a video frame in a video). The status detection engine 230 of the imaging system 200 of FIG. 7 (e.g., the device with the camera 740, a user device 730, and/or another computing system 1000 associated with these devices) can use the reprojected image 715 generated by the reprojection engine 220 to detect a warning 745 displayed on the display of the object 705 (the computer). For instance, the status detection engine 230 can detect and/or parse (e.g., using OCR), one or more characters of the warning 745 displayed on the display of the object 705 (the computer). The status detection engine 230 can detect a change in a color displayed on the display of the object 705 (the computer) associated with the warning 745, such as the blue of a "blue screen" error message or similar color changes. The status detection engine 230 can detect other changes in illumination characteristic(s) (e.g., illumination level, illumination color, illumination direction, and/or illumination pattern) from the display of the object 705 (the computer), with the display considered a type of light source as described above. In some examples, the status detection engine 230 can determine the meaning of an aspect of the warning 745 (e.g., character(s) of an error code detected and/or parsed using OCR, a color displayed using the display, or a combination thereof) by querying a lookup table or other data structure for the aspect of the warning 745.

The status detection engine 230 can generate a status indicator 720 and use output device(s) 240 to send the status indicator 720 to the user device 730 and cause the user device 730 to output the status indicator 720 to the user 735. The status indicator 720 can, in some examples, indicate that the object 705 is a computer. The status indicator 720 can, in some examples, indicate detection of the warning 745 given by the object 705. The status indicator 720 can, in some examples, indicate any character(s) detected and/or parsed (e.g., using OCR) in the warning 745, such as an error code. The status indicator 720 can, in some examples, indicate color(s) that the display of the object 705 (the computer) displays, such as the blue of a "blue screen" error message. The status indicator 720 can, in some examples, indicate a meaning of an aspect of the warning 745 (e.g., character(s) of an error code detected and/or parsed using OCR, a color displayed using the display, or a combination thereof) as determined by querying a lookup table or other data structure for the aspect of the warning 745. The status indicator 720 can, in some examples, include at least a portion of the reprojected image 715 of the object 705. The status indicator 720 can, in some examples, include at least a portion of the warning 745.

In some examples, the appearance of the warning 745 may be a change in the appearance of the object 705 (in comparison to previous images of the object 705) that is detected by the status detection engine 230 and indicated in the status indicator 720. For instance, in an illustrative example, the display of the object 705 (the computer) may have been previously displaying other content before displaying the warning 745. The status indicator 720 can detect the change in the appearance of the object, in particular the change in the display of the object 705 (the computer) from displaying the other content to displaying the warning 745. The status indicator 720 generated using the status detection engine 230 can indicate this change in the appearance of the object to the user device 730 and/or the user 735.

In some examples, the device that incudes the camera 740 is different from the user device 730. This way, the user 735 using the user device can keep track of the status of the object 705 via the status indicator 720 even if the user 735 and user device 730 are remote from the device with the camera 740. In some examples, the user device 730 includes the camera 740. Examples of the user device 730, and/or of the device with the camera 740, include the image capture and processing system 100, the image capture device 105A, the image processing device 105B, the HMD 310, the mobile handset 410, an imaging system that performs the imaging process 500 of FIG. 5, the neural network 800, an imaging system that performs the imaging process 900 of FIG. 9, the computing system 1000, or a combination thereof.

Figure 8:
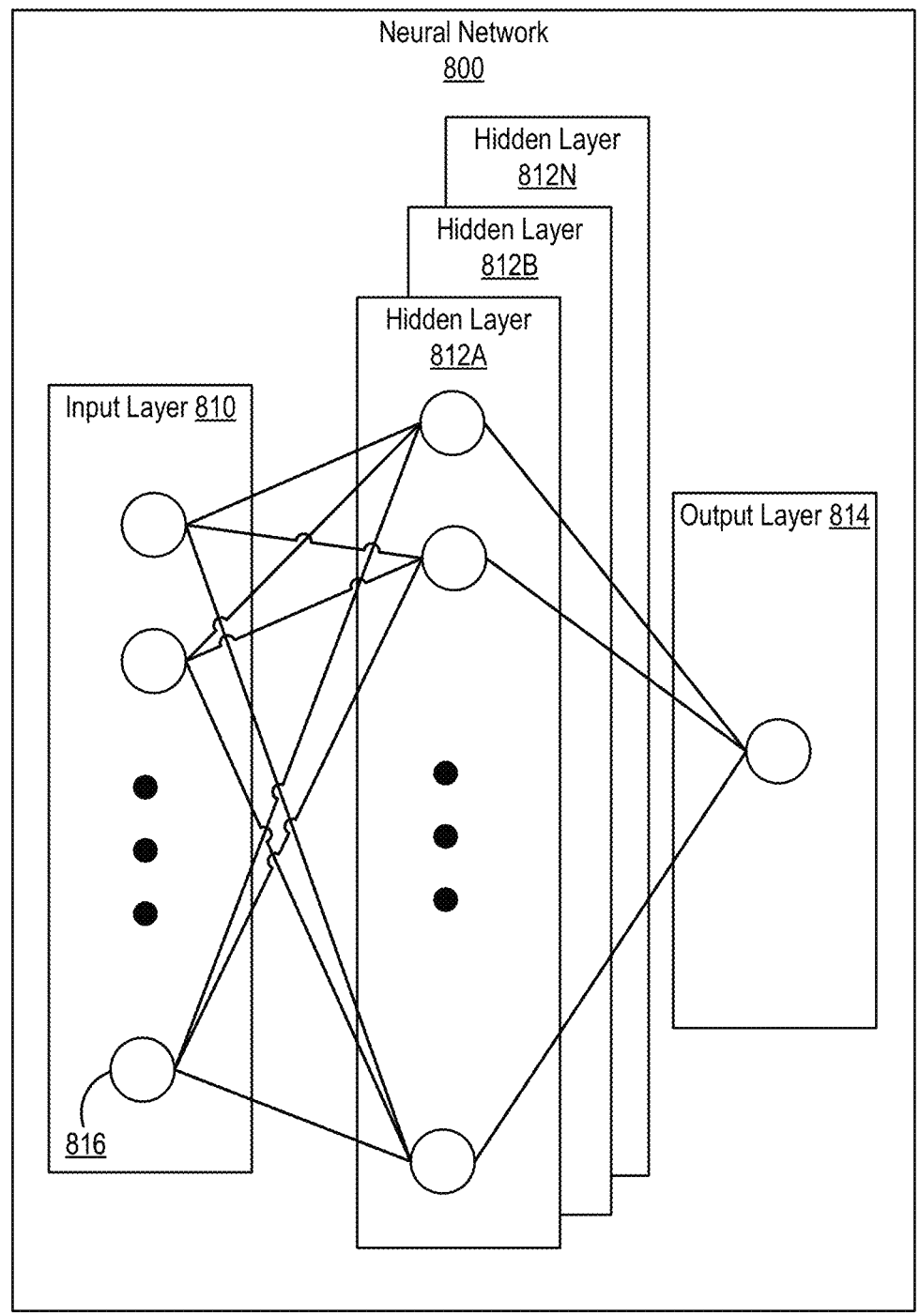
FIG. 8 is a block diagram illustrating an example of a neural network that can be used for image processing operations, in accordance with some examples.

FIG. 8 is a block diagram illustrating an example of a neural network (NN) 800 that can be used for media processing operations. The neural network 800 can include any type of deep network, such as a convolutional neural network (CNN), an autoencoder, a deep belief net (DBN), a Recurrent Neural Network (RNN), a Generative Adversarial Networks (GAN), a transformer, a, and/or other type of neural network. The neural network 800 may be an example of one of the trained ML model(s) 250. The trained ML model(s) 250 may be an example of the neural network 800. The neural network 800 may used by the object detector 215, the reprojection engine 220, the status detection engine 230, the trained ML model(s) 250, the feedback engine 255, or a combination thereof.

An input layer 810 of the neural network 800 includes input data. The input data of the input layer 810 can include data representing the pixels of one or more input image frames. In some examples, the input data of the input layer 810 includes data representing the pixels of image data, such as the an image captured by the image capture and processing system 100, the sensor data 210 captured by the sensor(s) 205, the reprojected sensor data 225 generated using the reprojection engine 220, an image captured by one of the cameras 330A-330D, an image captured by one of the cameras 430A-430D, the image 510, the image 710, the image data received in operation 905, image data captured using an image sensor of the input device 1045, or a combination thereof.

The images can include image data from an image sensor including raw pixel data (including a single color per pixel based, for example, on a Bayer filter) or processed pixel values (e.g., RGB pixels of an RGB image). The neural network 800 includes multiple hidden layers 812A, 812B, through 812N. The hidden layers 812A, 812B, through 812N include "N" number of hidden layers, where "N" is an integer greater than or equal to one. The number of hidden layers can be made to include as many layers as needed for the given application. The neural network 800 further includes an output layer 814 that provides an output resulting from the processing performed by the hidden layers 812A, 812B, through 812N.

In some examples, the output layer 814 can provide an output image and/or media dataset, such as a 3D mesh of a 3D model generated using the object detector 215, a texture for the 3D model generated using the object detector 215, the 3D model generated using the object detector 215, the reprojected sensor data 225 generated using the reprojection engine 220, the indicator 235 generated using the status detection engine 230, content output using the output device(s) 240, content displayed on the display(s) 340, content displayed on the display 440, the reprojected image 515, the status indicator 520, the reprojected image generated from the perspective of the virtual camera 610, the reprojected image 715, the status indicator 720, the reprojected image data generated in operation 915, the indicator of the status of the object output in operation 920, output data output using an output device 1035, or a combination thereof.

The neural network 800 is a multi-layer neural network of interconnected filters. Each filter can be trained to learn a feature representative of the input data. Information associated with the filters is shared among the different layers and each layer retains information as information is processed. In some cases, the neural network 800 can include a feed-forward network, in which case there are no feedback connections where outputs of the network are fed back into itself. In some cases, the network 800 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 810 can activate a set of nodes in the first hidden layer 812A. For example, as shown, each of the input nodes of the input layer 810 can be connected to each of the nodes of the first hidden layer 812A. The nodes of a hidden layer can transform the information of each input node by applying activation functions (e.g., signal mappings, truncation functions, ReLU, ReLU6, sigmoid, tanh, and/or softmax) and/or filters to this information. The information derived from the transformation can then be passed to and can activate the nodes of the next hidden layer 812B, which can perform their own designated functions. Example functions include convolutional functions, downscaling, upscaling, data transformation, and/or any other suitable functions. The output of the hidden layer 812B can then activate nodes of the next hidden layer, and so on. The output of the last hidden layer 812N can activate one or more nodes of the output layer 814, which provides a processed output image. In some cases, while nodes (e.g., node 816) in the neural network 800 are shown as having multiple output lines, a node has a single output and all lines shown as being output from a node represent the same output value.

In some cases, each node or interconnection between nodes can have a weight that is a set of parameters derived from the training of the neural network 800. For example, an interconnection between nodes can represent a piece of information learned about the interconnected nodes. The interconnection can have a tunable numeric weight that can be tuned (e.g., based on a training dataset), allowing the neural network 800 to be adaptive to inputs and able to learn as more and more data is processed.

The neural network 800 is pre-trained to process the features from the data in the input layer 810 using the different hidden layers 812A, 812B, through 812N in order to provide the output through the output layer 814.

Figure 9:
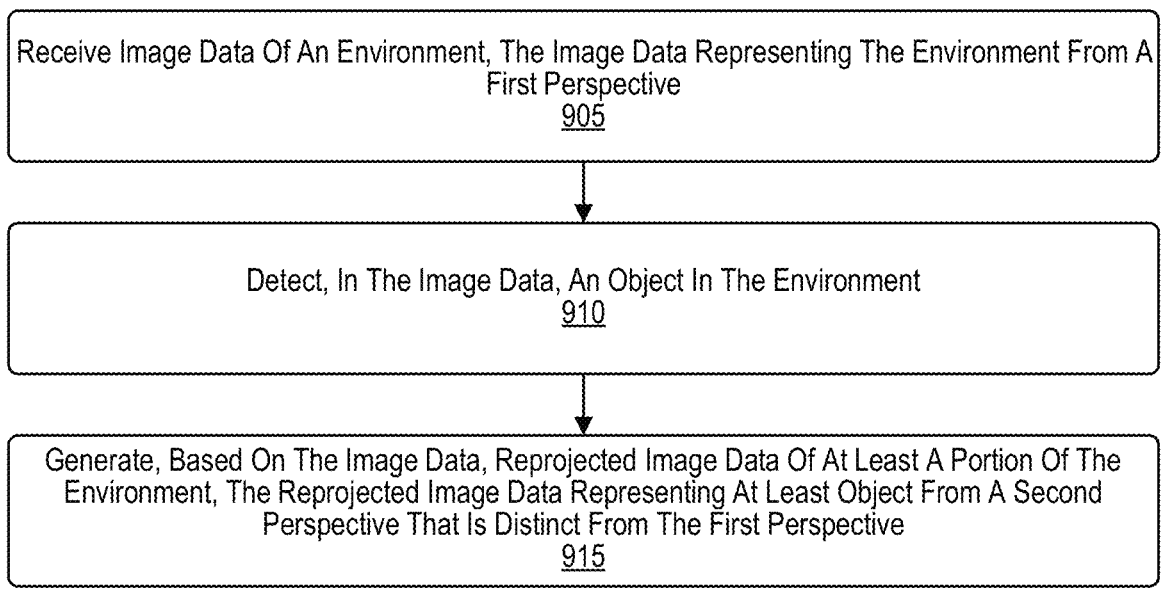
FIG. 9 is a flow diagram illustrating an imaging process, in accordance with some examples.

FIG. 9 is a flow diagram illustrating an imaging process 900. The imaging process 900 may be performed by an imaging system. In some examples, the imaging system can include, for example, the image capture and processing system 100, the image capture device 105A, the image processing device 105B, the image processor 150, the ISP 154, the host processor 152, the imaging system 200, the object detector 215, the reprojection engine 220, the status detection engine 230, the output device(s) 240, the trained ML model(s) 250, the feedback engine 255, the HMD 310, the mobile handset 410, an imaging system that performs the imaging process 500 of FIG. 5, the user device 530, the camera 540, an imaging system that performs the imaging process 700 of FIG. 7, the user device 730, the camera 740, the neural network 800, the computing system 1000, or a combination thereof.

At operation 905, the imaging system is configured to, and can, receive image data of an environment. The image data represents (e.g., depicts) the environment from a first perspective.

In some examples, the imaging system is configured to, and can, receive the image data from an image sensor. In some examples, the imaging system includes an image sensor connector that coupled and/or connects the image sensor to a remainder of the imaging system (e.g., including the processor and/or the memory of the imaging system), In some examples, the imaging system receives the image data from the image sensor by receiving the image data from, over, and/or using the image sensor connector.

Examples of the image sensor includes the image sensor 130, the sensor(s) 205, the first camera 330A, the second camera 330B, the third camera 330C, the fourth camera 330D, the first camera 430A, the second camera 430B, the third camera 430C, the fourth camera 430D, an image sensor of the camera 540, an image sensor of the camera 740, an image sensor used to capture an image used as input data for the input layer 810 of the NN 800, the input device 1045, another image sensor described herein, another sensor described herein, or a combination thereof.

Examples of the image data include image data captured using the image capture and processing system 100, the sensor data 210 captured using image sensor(s) of the sensor(s) 205, image data captured using the first camera 330A, image data captured using the second camera 330B, image data captured using the third camera 330C, image data captured using the fourth camera 330D, image data captured using the first camera 430A, image data captured using the second camera 430B, image data captured using the third camera 430C, image data captured using the fourth camera 430D, the image 510, the image 710, an image used as input data for the input layer 810 of the NN 800, an image captured using the input device 1045, another image described herein, another set of image data described herein, or a combination thereof.

At operation 910, the imaging system is configured to, and can, detect, in the image data, an object in the environment. In some examples, the imaging system can detect the object in the image data using the object detector 215, the trained ML model(s) 250, the NN 800, or a combination thereof. Examples of the object include an object in the scene 110, the firetruck illustrated in FIG. 2, the object 505, and the object 705.

At operation 915, the imaging system is configured to, and can, generate, based on the image data, reprojected image data of at least a portion of the environment, the reprojected image data representing at least the object from a second perspective that is distinct from the first perspective.

Examples of the reprojected image data include the reprojected sensor data 225, the indicator 235, reprojected image data displayed using the display(s) 340, reprojected image data displayed using the display 440, the reprojected image 515, a reprojected image simulating a perspective of the virtual camera 610, the reprojected image 715, a reprojected image generated using the NN 800, or a combination thereof.

In some aspects, the imaging system is configured to, and can, receive, using a user interface, an input that is indicative of the second perspective. In some examples, the input can indicate the object, and the second perspective can be orthogonal to at least a portion of a surface of the object. In some examples, the input can include a reference image that depicts the environment from the second perspective, which the imaging system can use to determine the second perspective. In some examples, the input can include a request from the user to pan, sweep, rotate, and/or otherwise move the viewport of a virtual camera (e.g., virtual camera 610) relative to the object and/or relative to the environment (e.g., in a particular direction and/or by a particular distance, angle, or amount).

In some aspects, the imaging system is configured to, and can, generate pose information corresponding to the second perspective based on positions of features of the object in the environment. In some examples, based on the detection of the object in operation 910, the imaging system can automatically generate the pose information for the second perspective so that the second perspective is directed in a direction that is orthogonal to at least a portion of a surface of the object. In some examples, the imaging system is configured to, and can, detect an occlusion that occludes a view of the object in the image data, and the imaging system can automatically generate the pose information for the second perspective so that the occlusion does not occlude the view of the object in the reprojected image data.

In some aspects, generating the reprojected image data of at least the portion of the environment includes using probabilistic reprojection to generate the reprojected image data (e.g., using the reprojection engine 220). In some aspects, generating the reprojected image data of at least the portion of the environment according to the second perspective includes using an output of a trained machine learning model in response to input of the image data and/or a geometry of the object into the trained machine learning model (e.g., using the reprojection engine 220, the trained ML model(s) 250, and/or the NN 800).

In some aspects, the imaging system is configured to, and can, receive prior image data of the environment. The imaging system can determine that the image data is missing visual information for a portion of the object. The portion of the object is to be discernable from the second perspective. Generating the reprojected image data of at least the portion of the environment in operation 915 can include reconstructing the visual information for the portion of the object based on the prior image data. For instance, the image 510 of the object 505 is captured from a first perspective having a steep angle that may make portions of the characters 545 blurry, unreadable, or missing. In such situations, the imaging system can retrieve prior image data of the object 505 and use the prior image data of the object 505 to fill in any gaps or missing image data, and/or to replace or improve low-quality image data from the image 510, to generate the reprojected image 515.

In some aspects, the imaging system is configured to, and can determine that the image data is missing visual information for a portion of the object. The portion of the object is to be discernable from the second perspective. Generating the reprojected image data of at least the portion of the environment in operation 915 can include reconstructing the visual information for the portion of the object using interpolation and/or an output of a trained machine learning model in response to input of the image data and/or a geometry of the object into the trained machine learning model (e.g., the trained ML model(s) 250 and/or the NN 800). For instance, the image 510 of the object 505 is captured from a first perspective having a steep angle that may make portions of the characters 545 blurry, unreadable, or missing. In such situations, the imaging system can use interpolation and/or the trained ML model to fill in any gaps or missing image data, and/or to replace or improve low-quality image data from the image 510, to generate the reprojected image 515.

In some aspects, the imaging system is configured to, and can, generate a mask associated with an occlusion over the portion of the object, where the image data is missing the visual information for the portion of the object due to the occlusion occluding the portion of the object in the image data. This can ensure that the imaging system does not treat the occlusion as part of the object by the imaging system, and is therefore does not include the occlusion in the reprojected image data. Instead, the imaging system can fill in missing image data where the mask (that indicates where the occlusion was) indicates based on prior image data, interpolation, and/or trained ML model(s) as discussed above.

In some aspects, the imaging system is configured to, and can, determine an illumination scheme illuminating the environment (e.g., in the image data). Generating the reprojected image data of at least the portion of the environment can include reconstructing the illumination scheme according to the second perspective. For instance, if the object 505 is illuminated from the right side in the image 510, the imaging system can detect this and reconstruct this illumination scheme in the reprojected image 515 to ensure that the object 505 is also depicted as being illuminated from the right side in the reprojected image 515. In some examples, reconstructing the illumination scheme can include applying gradient lighting, generating shadows, and the like. In some aspects, the imaging system is configured to, and can, modify the image data to normalize illumination in the image data before generating the reprojected image data of at least the portion of the environment based on the image data. For instance, if the image data includes illumination effects (e.g., shadows, glare, and/or other illumination effects) that make important parts of the object difficult to discern (e.g., makes the characters 545 difficult to read), normalizing the illumination in the image data can reduce or remove such illumination effects in the image data, and therefore also in the reprojected image data.

In some aspects, the imaging system is configured to, and can, output the reprojected image data. In some aspects, the imaging system is configured to, and can, generate and/or output an indicator of a status of the object based on the reprojected image data. Examples of the indicator include the indicator 235, an indicator displayed on the display(s) 340, an indicator displayed on the display 440, the status indicator 520, the status indicator 720, a status indicator generated using the NN 800, or a combination thereof.

In some aspects, the imaging system is configured to, and can, monitor a status of the object over a time period based on the reprojected image data. The image data and the reprojected image data can both include images corresponding to different times during the time period. The imaging system can identify a change in the status of the object during the time period. The indicator of the status of the object is indicative of the change in the status of the object. In some aspects, the change in the status of the object includes a change in an illumination characteristic of a light source, where the object includes the light source. For instance, the display screen of the object 705 (the computer) can be an example of the light source, and the warning 745 being displayed on the display of the object 705 (the computer) can be an example of the change in the illumination characteristic of the light source and/or the change in the status of the object. In some aspects, the imaging system is configured to, and can, parse one or more characters on the object in the reprojected image data using optical character recognition (OCR), where the change in the status of the object is associated with the one or more characters. For instance, the one or more characters can include the characters 545 and/or one or more characters of the warning 745. In some aspects, the change in the status of the object includes a change in a motion of at least a portion of the object. For instance, the motion of at least the portion of the object can include movement of the object 505 (the firetruck) as the object 505 drives, movement of the wheels of the object 505 (the firetruck), or movement of the visual element(s) (e.g., the warning 745) displayed on the display screen of the object 705 (the computer).

In some aspects, the image data is received from at least one image sensor, such as any of the examples of image sensors listed above. In some aspects, a first subset of the image data is received from a first image sensor, and a second subset of the image data is received from a second image sensor. The first image sensor and the second image sensor can be image sensors of different cameras of the imaging system, as in the first camera 330A and the second camera 330B of the HMD 310, or the cameras 430A-430D of the mobile handset 410. In some aspects, detecting the object in the image data includes tracking the object from the first subset of the image data to the second subset of the image data. For instance, the object may pass out of the field of view of the first image sensor and into the field of view of the second image sensor, or vice versa, either based on the object itself moving (e.g., for a movable object such as the object 505), based on movement of the imaging system (e.g., movement of the HMD 310 and/or the mobile handset 410) that causes the image sensors to move, or a combination thereof.

In some aspects, the imaging system is configured to, and can, cause a display (e.g., output device(s) 240, output device 1035) to display information based on the reprojected image data. In some aspects, the imaging system includes the display. In some aspects, the imaging system is configured to, and can, cause a communication interface (e.g., output device(s) 240, output device 1035, communication interface 1040) to transmit information based on the reprojected image data to a recipient device In some examples, the imaging system includes the communication interface.

In some examples, the imaging system can includes: means for receiving image data of an environment, the image data representing the environment from a first perspective; means for detecting, in the image data, an object in the environment; and means for generating, based on the image data, reprojected image data of at least the portion of the environment, the reprojected image data representing at least the object from a second perspective that is distinct from the first perspective.

In some examples, the means for receiving the image data includes the image capture and processing system 100, the image capture device 105A, the image processing device 105B, the image processor 150, the ISP 154, the host processor 152, the image sensor 130, the sensor(s) 205, the first camera 330A, the second camera 330B, the third camera 330C, the fourth camera 330D, the first camera 430A, the second camera 430B, the third camera 430C, the fourth camera 430D, an image sensor of the camera 540, an image sensor of the camera 740, an image sensor used to capture an image used as input data for the input layer 810 of the NN 800, the input device 1045, another image sensor described herein, another sensor described herein, or a combination thereof.

In some examples, the means for detecting the object includes the image capture and processing system 100, the image processing device 105B, the image processor 150, the ISP 154, the host processor 152, the imaging system 200, the object detector 215, the trained ML model(s) 250, the NN 800, the computing system 1000, or a combination thereof.

In some examples, the means for generating the reprojected image includes the image capture and processing system 100, the image processing device 105B, the image processor 150, the ISP 154, the host processor 152, the imaging system 200, the reprojection engine 220, the trained ML model(s) 250, the NN 800, the computing system 1000, or a combination thereof.

In some examples, the processes described herein (e.g., the respective processes of FIGS. 1, 2, 5, 7, 8, the process 900 of FIG. 9, and/or other processes described herein) may be performed by a computing device or apparatus. In some examples, the processes described herein can be performed by the image capture and processing system 100, the image capture device 105A, the image processing device 105B, the image processor 150, the ISP 154, the host processor 152, the imaging system 200, the object detector 215, the reprojection engine 220, the status detection engine 230, the output device(s) 240, the trained ML model(s) 250, the feedback engine 255, the HMD 310, the mobile handset 410, an imaging system that performs the imaging process 500 of FIG. 5, the user device 530, the camera 540, an imaging system that performs the imaging process 700 of FIG. 7, the user device 730, the camera 740, the neural network 800, an imaging system that performs the imaging process 900 of FIG. 9, the computing system 1000, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
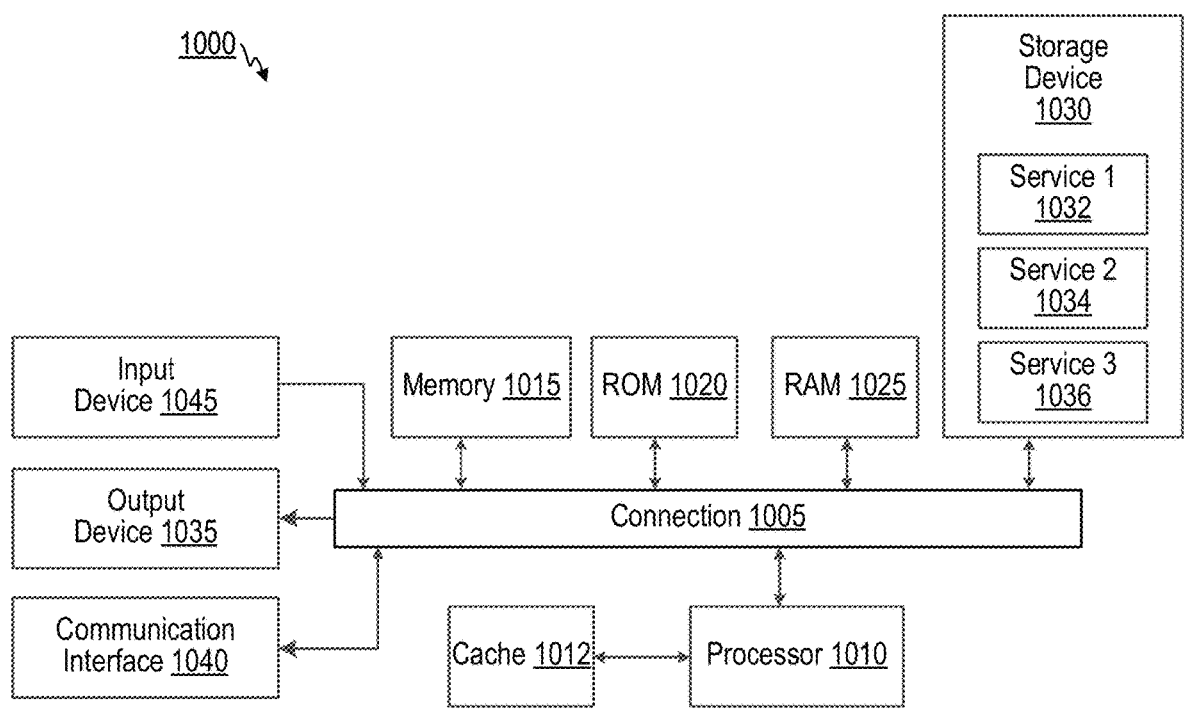
FIG. 10 is a diagram illustrating an example of a computing system for implementing certain aspects described herein.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some aspects, computing system 1000 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1002.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europebased Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some aspects, a hardware service that performs a particular function can include the software component stored in a computer-readable medium in connection with the necessary hardware components, such as processor 1010, connection 1005, output device 1035, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for media processing, the apparatus comprising: a memory; and one or more processors coupled to the memory, the one or more processors configured to: receive image data of an environment, the image data representing the environment from a first perspective; detect, in the image data, an object in the environment; and generate, based on the image data, reprojected image data of at least a portion of the environment, the reprojected image data representing at least the object from a second perspective that is distinct from the first perspective.

Aspect 2. The apparatus of Aspect 1, wherein the at least one processor is configured to: receive an input using a user interface, wherein the input is indicative of the second perspective.

Aspect 3. The apparatus of any of Aspects 1 to 2, wherein the at least one processor is configured to: generate pose information corresponding to the second perspective based on positions of features of the object in the environment.

Aspect 4. The apparatus of any of Aspects 1 to 3, wherein, to generate the reprojected image data of at least the portion of the environment according to the second perspective, the at least one processor is configured to use probabilistic reprojection to generate the reprojected image data.

Aspect 5. The apparatus of any of Aspects 1 to 4, wherein, to generate the reprojected image data of at least the portion of the environment according to the second perspective, the at least one processor is configured to use an output of a trained machine learning model in response to input of the image data into the trained machine learning model.

Aspect 6. The apparatus of any of Aspects 1 to 5, wherein the at least one processor is configured to: receive prior image data of the environment; and determine that the image data is missing visual information for a portion of the object, wherein the portion of the object is to be discernable from the second perspective, wherein, to generate the reprojected image data of at least the portion of the environment according to the second perspective, the at least one processor is configured to reconstruct the visual information for the portion of the object based on the prior image data.

Aspect 7. The apparatus of any of Aspects 1 to 6, wherein the at least one processor is configured to: generate a mask associated with an occlusion over the portion of the object, wherein the image data is missing the visual information for the portion of the object due to the occlusion occluding the portion of the object in the image data.

Aspect 8. The apparatus of any of Aspects 1 to 7, wherein the at least one processor is configured to: determine that the image data is missing visual information for a portion of the object, wherein the portion of the object is to be discernable from the second perspective, wherein, to generate the reprojected image data of at least the portion of the environment according to the second perspective, the at least one processor is configured to reconstruct the visual information for the portion of the object using an output of a trained machine learning model in response to input of the image data into the trained machine learning model.

Aspect 9. The apparatus of any of Aspects 1 to 8, wherein the at least one processor is configured to: determine an illumination scheme illuminating the environment, wherein, to generate the reprojected image data of at least the portion of the environment according to the second perspective, the at least one processor is configured to reconstruct the illumination scheme according to the second perspective.

Aspect 10. The apparatus of any of Aspects 1 to 9, wherein the at least one processor is configured to: modify the image data to normalize illumination in the image data before generating the reprojected image data of at least the portion of the environment based on the image data.

Aspect 11. The apparatus of any of Aspects 1 to 10, wherein the at least one processor is configured to: output an indicator of a status of the object based on the reprojected image data.

Aspect 12. The apparatus of any of Aspects 1 to 11, wherein the at least one processor is configured to: monitor a status of the object over a time period based on the reprojected image data, wherein the image data and the reprojected image data both include images corresponding to different times during the time period; and identify a change in the status of the object during the time period, wherein the indicator of the status of the object is indicative of the change in the status of the object.

Aspect 13. The apparatus of any of Aspects 1 to 12, wherein the change in the status of the object includes a change in an illumination characteristic of a light source, wherein the object includes the light source.

Aspect 14. The apparatus of any of Aspects 1 to 13, wherein the at least one processor is configured to: parse one or more characters on the object in the reprojected image data using optical character recognition (OCR), wherein the change in the status of the object is associated with the one or more characters.

Aspect 15. The apparatus of any of Aspects 1 to 14, wherein the change in the status of the object includes a change in a motion of at least a portion of the object.

Aspect 16. The apparatus of any of Aspects 1 to 15, wherein the image data is received from an image sensor.

Aspect 17. The apparatus of any of Aspects 1 to 16, wherein a first subset of the image data is received from a first image sensor, wherein a second subset of the image data is received from a second image sensor.

Aspect 18. The apparatus of any of Aspects 1 to 17, wherein, to detect the object in the image data, the at least one processor is configured to track the object from the first subset of the image data to the second subset of the image data.

Aspect 19. The apparatus of any of Aspects 1 to 18, further comprising: a display configured to display information based on the reprojected image data.

Aspect 20. The apparatus of any of Aspects 1 to 19, further comprising: a communication interface configured to transmit information based on the reprojected image data to a recipient device.

Aspect 21. The apparatus of any of Aspects 1 to 20, wherein the apparatus includes at least one of a head-mounted display (HMD), a mobile handset, or a wireless communication device.

Aspect 22. A method for imaging, the method comprising: receiving image data of an environment, the image data representing the environment from a first perspective; detecting, in the image data, an object in the environment; and generating, based on the image data, reprojected image data of at least a portion of the environment, the reprojected image data representing at least the object from a second perspective that is distinct from the first perspective.

Aspect 23. The method of Aspect 22, further comprising: receiving an input using a user interface, wherein the input is indicative of the second perspective.

Aspect 24. The method of any of Aspects 22 to 23, further comprising: generating pose information corresponding to the second perspective based on positions of features of the object in the environment.

Aspect 25. The method of any of Aspects 22 to 24, wherein generating the reprojected image data of at least the portion of the environment includes using probabilistic reprojection to generate the reprojected image data.

Aspect 26. The method of any of Aspects 22 to 25, wherein generating the reprojected image data of at least the portion of the environment according to the second perspective includes using an output of a trained machine learning model in response to input of the image data into the trained machine learning model.

Aspect 27. The method of any of Aspects 22 to 26, further comprising: receiving prior image data of the environment; and determining that the image data is missing visual information for a portion of the object, wherein the portion of the object is to be discernable from the second perspective, wherein generating the reprojected image data of at least the portion of the environment includes reconstructing the visual information for the portion of the object based on the prior image data.

Aspect 28. The method of any of Aspects 22 to 27, further comprising: generating a mask associated with an occlusion over the portion of the object, wherein the image data is missing the visual information for the portion of the object due to the occlusion occluding the portion of the object in the image data.

Aspect 29. The method of any of Aspects 22 to 28, further comprising: determining that the image data is missing visual information for a portion of the object, wherein the portion of the object is to be discernable from the second perspective, wherein generating the reprojected image data of at least the portion of the environment includes reconstructing the visual information for the portion of the object using an output of a trained machine learning model in response to input of the image data into the trained machine learning model.

Aspect 30. The method of any of Aspects 22 to 29, further comprising: determining an illumination scheme illuminating the environment, wherein generating the reprojected image data of at least the portion of the environment includes reconstructing the illumination scheme according to the second perspective.

Aspect 31. The method of any of Aspects 22 to 30, further comprising: modifying the image data to normalize illumination in the image data before generating the reprojected image data of at least the portion of the environment based on the image data.

Aspect 32. The method of any of Aspects 22 to 31, further comprising: outputting an indicator of a status of the object based on the reprojected image data.

Aspect 33. The method of any of Aspects 22 to 32, further comprising: monitoring a status of the object over a time period based on the reprojected image data, wherein the image data and the reprojected image data both include images corresponding to different times during the time period; and identifying a change in the status of the object during the time period, wherein the indicator of the status of the object is indicative of the change in the status of the object.

Aspect 34. The method of any of Aspects 22 to 33, wherein the change in the status of the object includes a change in an illumination characteristic of a light source, wherein the object includes the light source.

Aspect 35. The method of any of Aspects 22 to 34, further comprising: parsing one or more characters on the object in the reprojected image data using optical character recognition (OCR), wherein the change in the status of the object is associated with the one or more characters.

Aspect 36. The method of any of Aspects 22 to 35, wherein the change in the status of the object includes a change in a motion of at least a portion of the object.

Aspect 37. The method of any of Aspects 22 to 36, wherein the image data is received from an image sensor.

Aspect 38. The method of any of Aspects 22 to 37, wherein a first subset of the image data is received from a first image sensor, wherein a second subset of the image data is received from a second image sensor.

Aspect 39. The method of any of Aspects 22 to 38, wherein detecting the object in the image data includes tracking the object from the first subset of the image data to the second subset of the image data.

Aspect 40. The method of any of Aspects 22 to 39, further comprising: causing a display to display information based on the reprojected image data.

Aspect 41. The method of any of Aspects 22 to 40, further comprising: causing a communication interface to transmit information based on the reprojected image data to a recipient device.

Aspect 42. The method of any of Aspects 22 to 41, wherein the method is performed using an apparatus that includes at least one of a head-mounted display (HMD), a mobile handset, or a wireless communication device.

Aspect 43: A non-transitory computer-readable medium having stored thereon instructions that, when executed by one or more processors, cause the one or more processors to: receive image data of an environment, the image data representing the environment from a first perspective; detect, in the image data, an object in the environment; and generate, based on the image data, reprojected image data of at least a portion of the environment, the reprojected image data representing at least the object from a second perspective that is distinct from the first perspective.

Aspect 44: The non-transitory computer-readable medium of Aspect 43, further comprising operations according to any of Aspects 2 to 21, and/or any of Aspects 22 to 42.

Aspect 45: An apparatus for image processing, the apparatus comprising: means for receiving image data of an environment, the image data representing the environment from a first perspective; means for detecting, in the image data, an object in the environment; and means for generating, based on the image data, reprojected image data of at least a portion of the environment, the reprojected image data representing at least the object from a second perspective that is distinct from the first perspective.

Aspect 46: The apparatus of Aspect 45, further comprising means for performing operations according to any of Aspects 2 to 21, and/or any of Aspects 22 to 42.

What is claimed is:

1. An apparatus for imaging, the apparatus comprising:
   at least one memory; and
   at least one processor coupled to the at least one memory, the at least one processor configured to:
      receive image data of an environment, the image data representing the environment from a first perspective, the image data associated with a plurality of images captured at a plurality of times;
      detect, in the image data, an object in the environment, wherein the object includes a light source;
      generate, based on the image data, reprojected image data of at least a portion of the environment, the reprojected image data representing at least the object from a second perspective that is distinct from the first perspective;
      monitor, across the plurality of times, a characteristic of emission of light by the light source of the object based on the reprojected image data to detect a change in the characteristic from a first time to a second time, wherein the plurality of times includes the first time and the second time; and
      output an indicator of the change in the characteristic of the emission of light by the light source of the object.

2. The apparatus of claim 1, wherein the at least one processor is configured to:
   receive an input using a user interface, wherein the input is indicative of the second perspective.

3. The apparatus of claim 1, wherein the at least one processor is configured to:
   generate pose information corresponding to the second perspective based on positions of features of the object in the environment.

4. The apparatus of claim 1, wherein, to generate the reprojected image data of at least the portion of the environment according to the second perspective, the at least one processor is configured to use probabilistic reprojection to generate the reprojected image data.

5. The apparatus of claim 1, wherein, to generate the reprojected image data of at least the portion of the environment according to the second perspective, the at least one processor is configured to use an output of a trained machine learning model in response to input of the image data into the trained machine learning model.

6. The apparatus of claim 1, wherein the at least one processor is configured to:
   receive prior image data of the environment; and
   determine that the image data is missing visual information for a portion of the object, wherein the portion of the object is to be discernable from the second perspective, wherein, to generate the reprojected image data of at least the portion of the environment according to the second perspective, the at least one processor is configured to reconstruct the visual information for the portion of the object based on the prior image data.

7. The apparatus of claim 6, wherein the at least one processor is configured to:

generate a mask associated with an occlusion over the portion of the object, wherein the image data is missing the visual information for the portion of the object due to the occlusion occluding the portion of the object in the image data.

8. The apparatus of claim 1, wherein the at least one processor is configured to:
determine that the image data is missing visual information for a portion of the object, wherein the portion of the object is to be discernable from the second perspective, wherein, to generate the reprojected image data of at least the portion of the environment according to the second perspective, the at least one processor is configured to reconstruct the visual information for the portion of the object using an output of a trained machine learning model in response to input of the image data into the trained machine learning model.

9. The apparatus of claim 1, wherein the at least one processor is configured to:
determine an illumination scheme illuminating the environment, wherein, to generate the reprojected image data of at least the portion of the environment according to the second perspective, the at least one processor is configured to reconstruct the illumination scheme according to the second perspective.

10. The apparatus of claim 1, wherein the at least one processor is configured to:
modify the image data to normalize illumination in the image data before generating the reprojected image data of at least the portion of the environment based on the image data.

11. The apparatus of claim 1, wherein the indicator of the change in the characteristic identifies the characteristic at the first time and the characteristic at the second time.

12. The apparatus of claim 1, wherein the at least one processor is configured to:
monitor, across the plurality of times, a location of the object to detect a change in a pose of the object; and
output an indicator of the change in the pose of the object.

13. The apparatus of claim 1, wherein the characteristic includes at least one of an activation status of the light source, an illumination level of the light source, an illumination color associated with the light source, or an illumination pattern associated with the light source.

14. The apparatus of claim 1, wherein the at least one processor is configured to:
parse one or more characters displayed by the light source of the object in the reprojected image data using optical character recognition (OCR), wherein the change in the characteristic is associated with display of the one or more characters.

15. The apparatus of claim 1, wherein the light source includes a display of the object, and wherein the change in the characteristic includes a change in content displayed by the display.

16. The apparatus of claim 1, wherein the image data is received from an image sensor.

17. The apparatus of claim 1, wherein a first subset of the image data is received from a first image sensor, wherein a second subset of the image data is received from a second image sensor.

18. The apparatus of claim 1, wherein, to detect the object in the image data, the at least one processor is configured to track the object between a first subset of the image data and a second subset of the image data.

19. The apparatus of claim 1, further comprising:
a display configured to display the indicator.

20. The apparatus of claim 1, further comprising:
a communication interface configured to transmit the indicator to a recipient device.

21. The apparatus of claim 1, wherein the apparatus includes at least one of a head-mounted display (HMD), a mobile handset, or a wireless communication device.

22. A method for imaging, the method comprising:
receiving image data of an environment, the image data representing the environment from a first perspective, the image data associated with a plurality of images captured at a plurality of times;
detecting, in the image data, an object in the environment, wherein the object includes a light source;
generating, based on the image data, reprojected image data of at least a portion of the environment, the reprojected image data representing at least the object from a second perspective that is distinct from the first perspective;
monitoring, across the plurality of times, a characteristic of emission of light by the light source of the object based on the reprojected image data to detect a change in the characteristic from a first time to a second time, wherein the plurality of times includes the first time and the second time; and
outputting an indicator of the change in the characteristic of the emission of light by the light source of the object.

23. The method of claim 22, further comprising:
receiving an input using a user interface, wherein the input is indicative of the second perspective.

24. The method of claim 22, further comprising:
generating pose information corresponding to the second perspective based on positions of features of the object in the environment.

25. The method of claim 22, wherein generating the reprojected image data of at least the portion of the environment includes using probabilistic reprojection to generate the reprojected image data.

26. The method of claim 22, wherein generating the reprojected image data of at least the portion of the environment according to the second perspective includes using an output of a trained machine learning model in response to input of the image data into the trained machine learning model.

27. The method of claim 22, further comprising:
determining that the image data is missing visual information for a portion of the object, wherein the portion of the object is to be discernable from the second perspective, wherein generating the reprojected image data of at least the portion of the environment includes reconstructing the visual information for the portion of the object using an output of a trained machine learning model in response to input of the image data into the trained machine learning model.

28. The method of claim 22, wherein the indicator of the change in the characteristic identifies the characteristic at the first time and the characteristic at the second time.

29. The method of claim 22, further comprising:
monitoring, across the plurality of times, a location of the object to detect a change in a pose of the object; and
outputting an indicator of the change in the pose of the object.

30. The method of claim 22, wherein a first subset of the image data is received from a first image sensor, wherein a second subset of the image data is received from a second image sensor.

* * * * *